(12) United States Patent
Reed et al.

(10) Patent No.: US 9,497,393 B2
(45) Date of Patent: Nov. 15, 2016

(54) SYSTEMS AND METHODS THAT EMPLOY OBJECT RECOGNITION

(75) Inventors: William G. Reed, Seattle, WA (US); Dale H. DeGraff, Brier, WA (US)

(73) Assignee: EXPRESS IMAGING SYSTEMS, LLC, Renton, WA (US)

( * ) Notice: Subject to any disclaimer, the term of this patent is extended or adjusted under 35 U.S.C. 154(b) by 560 days.

(21) Appl. No.: 13/411,321

(22) Filed: Mar. 2, 2012

(65) Prior Publication Data

US 2013/0229518 A1    Sep. 5, 2013

(51) Int. Cl.
*H04N 5/33* (2006.01)
*H05B 37/02* (2006.01)
*H04N 5/232* (2006.01)
*H04N 5/235* (2006.01)

(52) U.S. Cl.
CPC .............. *H04N 5/33* (2013.01); *H04N 5/2354* (2013.01); *H04N 5/23254* (2013.01); *H05B 37/0227* (2013.01); *H05B 37/0272* (2013.01); *Y02B 20/72* (2013.01)

(58) Field of Classification Search
CPC ...... G08G 1/07; G08G 1/095; G08G 1/0175; G08G 1/054; G08G 1/096; G08G 1/097; G08G 1/096716; G08G 1/096783; G08G 1/04
See application file for complete search history.

(56) References Cited

U.S. PATENT DOCUMENTS

| | | |
|---|---|---|
| 2,240,050 A | 4/1941 | Nuebling |
| 3,374,396 A | 3/1968 | Bell et al. |
| 4,153,927 A | 5/1979 | Owens |
| 4,237,377 A | 12/1980 | Sansum |
| 4,663,521 A | 5/1987 | Maile |
| 5,086,379 A | 2/1992 | Denison et al. |
| 5,160,202 A | 11/1992 | Légaré |

(Continued)

FOREIGN PATENT DOCUMENTS

| | | |
|---|---|---|
| DE | 4001980 A1 | 8/1990 |
| EP | 1 734 795 A1 | 12/2006 |

(Continued)

OTHER PUBLICATIONS

Reed et al., "Apparatus and Method for Schedule Based Operation of a Luminaire," Office Action mailed Mar. 26, 2014, for U.S. Appl. No. 13/604,327, 10 pages.

(Continued)

*Primary Examiner* — Chikaodili E Anyikire
*Assistant Examiner* — Kehinde O Abimbola
(74) *Attorney, Agent, or Firm* — Seed IP Law Group LLP

(57) ABSTRACT

An illumination system and methods to control a light source are provided. An illumination system includes a light source, a two-dimensional non-Passive Infrared (non-PIR) imager, and a controller. The light source may provide at least two levels of illumination. The non-PIR imager images an area and to produce image data representative of images across at least part of a visible portion of an electromagnetic spectrum. The controller is communicatively coupled to receive the image data from the non-PIR imager and process the received image data to detect at least one object in the area of a defined type of object. The controller is also coupled to control operation of the light source based on, at least in part, detection of the ambient characteristic of the environment. Alternatively, one or more components of a system may be used to monitor traffic, with or without active illumination.

38 Claims, 4 Drawing Sheets

(56) References Cited

U.S. PATENT DOCUMENTS

| | | | |
|---|---|---|---|
| 5,161,107 A * | 11/1992 | Mayeaux et al. | 701/117 |
| 5,230,556 A | 7/1993 | Canty et al. | |
| 5,276,385 A | 1/1994 | Itoh et al. | |
| 5,343,121 A | 8/1994 | Terman et al. | |
| 5,349,505 A | 9/1994 | Poppenheimer | |
| 5,450,302 A | 9/1995 | Maase et al. | |
| 5,561,351 A | 10/1996 | Vrionis et al. | |
| 5,589,741 A | 12/1996 | Terman et al. | |
| 5,808,294 A | 9/1998 | Neumann | |
| 5,869,960 A | 2/1999 | Brand | |
| 5,892,331 A | 4/1999 | Hollaway | |
| 5,892,335 A | 4/1999 | Archer | |
| 5,936,362 A | 8/1999 | Alt et al. | |
| 6,111,739 A | 8/2000 | Wu et al. | |
| 6,154,015 A | 11/2000 | Ichiba | |
| 6,160,353 A | 12/2000 | Mancuso | |
| 6,377,191 B1 * | 4/2002 | Takubo | 340/937 |
| 6,612,720 B1 | 9/2003 | Beadle | |
| 6,674,060 B2 | 1/2004 | Antila | |
| 6,681,195 B1 * | 1/2004 | Poland et al. | 702/142 |
| 6,746,274 B1 | 6/2004 | Verfuerth | |
| 6,753,842 B1 | 6/2004 | Williams et al. | |
| 6,828,911 B2 | 12/2004 | Jones et al. | |
| 6,841,947 B2 | 1/2005 | Berg-johansen | |
| 6,902,292 B2 | 6/2005 | Lai | |
| 6,985,827 B2 * | 1/2006 | Williams et al. | 702/142 |
| 7,019,276 B2 | 3/2006 | Cloutier et al. | |
| 7,066,622 B2 | 6/2006 | Alessio | |
| 7,081,722 B1 | 7/2006 | Huynh et al. | |
| 7,122,976 B1 | 10/2006 | Null et al. | |
| 7,188,967 B2 | 3/2007 | Dalton et al. | |
| 7,190,121 B2 | 3/2007 | Rose et al. | |
| 7,196,477 B2 | 3/2007 | Richmond | |
| 7,239,087 B2 | 7/2007 | Ball | |
| 7,252,385 B2 | 8/2007 | Engle et al. | |
| 7,258,464 B2 | 8/2007 | Morris et al. | |
| 7,281,820 B2 | 10/2007 | Bayat et al. | |
| 7,294,973 B2 | 11/2007 | Takahama et al. | |
| 7,314,291 B2 | 1/2008 | Tain et al. | |
| 7,317,403 B2 | 1/2008 | Grootes et al. | |
| 7,322,714 B2 | 1/2008 | Barnett et al. | |
| 7,330,568 B2 * | 2/2008 | Nagaoka et al. | 382/104 |
| 7,339,323 B2 | 3/2008 | Bucur | |
| 7,339,471 B1 | 3/2008 | Chan et al. | |
| 7,405,524 B2 | 7/2008 | Null et al. | |
| 7,438,440 B2 | 10/2008 | Dorogi | |
| 7,440,280 B2 | 10/2008 | Shuy | |
| 7,468,723 B1 | 12/2008 | Collins | |
| 7,524,089 B2 | 4/2009 | Park | |
| 7,538,499 B2 | 5/2009 | Ashdown | |
| 7,547,113 B2 | 6/2009 | Lee | |
| 7,564,198 B2 | 7/2009 | Yamamoto et al. | |
| 7,569,802 B1 | 8/2009 | Mullins | |
| 7,578,596 B2 | 8/2009 | Martin | |
| 7,578,597 B2 | 8/2009 | Hoover et al. | |
| 7,627,372 B2 | 12/2009 | Vaisnys et al. | |
| 7,631,324 B2 | 12/2009 | Buonasera et al. | |
| 7,633,463 B2 | 12/2009 | Negru | |
| 7,638,743 B2 | 12/2009 | Bartol et al. | |
| 7,677,753 B1 | 3/2010 | Wills | |
| 7,688,002 B2 | 3/2010 | Ashdown et al. | |
| 7,688,222 B2 | 3/2010 | Peddie et al. | |
| 7,702,135 B2 | 4/2010 | Hill et al. | |
| 7,703,951 B2 | 4/2010 | Piepgras et al. | |
| 7,746,003 B2 | 6/2010 | Verfuerth et al. | |
| D621,410 S | 8/2010 | Verfuerth et al. | |
| D621,411 S | 8/2010 | Verfuerth et al. | |
| 7,798,669 B2 | 9/2010 | Trojanowski et al. | |
| 7,804,200 B2 | 9/2010 | Flaherty | |
| 7,828,463 B1 | 11/2010 | Willis | |
| 7,834,922 B2 | 11/2010 | Kurane | |
| 7,932,535 B2 | 4/2011 | Mahalingam et al. | |
| 7,940,191 B2 | 5/2011 | Hierzer | |
| 7,952,609 B2 | 5/2011 | Simerly et al. | |
| 7,960,919 B2 | 6/2011 | Furukawa | |
| 7,985,005 B2 | 7/2011 | Alexander et al. | |
| 8,100,552 B2 | 1/2012 | Spero | |
| 8,118,456 B2 | 2/2012 | Reed et al. | |
| 8,143,769 B2 | 3/2012 | Li | |
| 8,174,212 B2 | 5/2012 | Tziony et al. | |
| 8,207,830 B2 | 6/2012 | Rutjes et al. | |
| 8,290,710 B2 | 10/2012 | Cleland et al. | |
| 8,334,640 B2 | 12/2012 | Reed et al. | |
| 8,344,665 B2 | 1/2013 | Verfuerth et al. | |
| 8,376,583 B2 | 2/2013 | Wang et al. | |
| 8,378,563 B2 | 2/2013 | Reed et al. | |
| 8,395,329 B2 | 3/2013 | Jutras et al. | |
| 8,445,826 B2 | 5/2013 | Verfuerth | |
| 8,476,565 B2 | 7/2013 | Verfuerth | |
| 8,508,137 B2 | 8/2013 | Reed | |
| 8,541,950 B2 | 9/2013 | Reed | |
| 8,586,902 B2 | 11/2013 | Verfuerth | |
| 8,604,701 B2 | 12/2013 | Verfuerth et al. | |
| 8,749,635 B2 * | 6/2014 | Hogasten et al. | 348/164 |
| 8,764,237 B2 | 7/2014 | Wang et al. | |
| 8,779,340 B2 | 7/2014 | Verfuerth et al. | |
| 8,779,686 B2 | 7/2014 | Jin | |
| 8,866,392 B2 | 10/2014 | Chen | |
| 8,866,582 B2 | 10/2014 | Verfuerth et al. | |
| 8,872,430 B2 | 10/2014 | Yang | |
| 8,872,964 B2 * | 10/2014 | Reed et al. | 348/370 |
| 8,884,203 B2 | 11/2014 | Verfuerth et al. | |
| 8,921,751 B2 | 12/2014 | Verfuerth | |
| 9,084,310 B2 | 7/2015 | Bedell et al. | |
| 2002/0084767 A1 | 7/2002 | Arai | |
| 2003/0016143 A1 | 1/2003 | Ghazarian | |
| 2003/0184672 A1 * | 10/2003 | Wu et al. | 348/362 |
| 2004/0015289 A1 * | 1/2004 | Poland et al. | 701/117 |
| 2004/0101166 A1 * | 5/2004 | Williams et al. | 382/104 |
| 2004/0183906 A1 * | 9/2004 | Nagaoka et al. | 348/148 |
| 2004/0192227 A1 | 9/2004 | Beach et al. | |
| 2005/0117344 A1 | 6/2005 | Bucher et al. | |
| 2005/0131607 A1 * | 6/2005 | Breed | 701/45 |
| 2005/0174762 A1 | 8/2005 | Fogerlie | |
| 2005/0231133 A1 | 10/2005 | Lys | |
| 2006/0014118 A1 | 1/2006 | Utama | |
| 2006/0066264 A1 | 3/2006 | Ishigaki et al. | |
| 2006/0146652 A1 | 7/2006 | Huizi et al. | |
| 2006/0208667 A1 | 9/2006 | Lys et al. | |
| 2007/0032990 A1 | 2/2007 | Williams et al. | |
| 2007/0102033 A1 | 5/2007 | Petrocy | |
| 2007/0164689 A1 | 7/2007 | Suzuki | |
| 2007/0224461 A1 | 9/2007 | Oh | |
| 2007/0225933 A1 * | 9/2007 | Shimomura | 702/127 |
| 2008/0018261 A1 | 1/2008 | Kastner | |
| 2008/0043106 A1 | 2/2008 | Hassapis et al. | |
| 2008/0062687 A1 | 3/2008 | Behar et al. | |
| 2008/0130304 A1 | 6/2008 | Rash et al. | |
| 2008/0215279 A1 | 9/2008 | Salsbury et al. | |
| 2008/0224623 A1 | 9/2008 | Yu | |
| 2008/0232116 A1 | 9/2008 | Kim | |
| 2008/0248837 A1 | 10/2008 | Kunkel | |
| 2008/0266839 A1 | 10/2008 | Claypool et al. | |
| 2009/0046151 A1 * | 2/2009 | Nagaoka et al. | 348/148 |
| 2009/0129067 A1 | 5/2009 | Fan et al. | |
| 2009/0153062 A1 | 6/2009 | Guo et al. | |
| 2009/0160358 A1 | 6/2009 | Leiderman | |
| 2009/0161356 A1 | 6/2009 | Negley et al. | |
| 2009/0167203 A1 | 7/2009 | Dahlman et al. | |
| 2009/0195179 A1 | 8/2009 | Joseph et al. | |
| 2009/0230883 A1 | 9/2009 | Haug | |
| 2009/0235208 A1 | 9/2009 | Nakayama et al. | |
| 2009/0261735 A1 | 10/2009 | Sibalich et al. | |
| 2009/0268023 A1 | 10/2009 | Hsieh | |
| 2009/0273290 A1 | 11/2009 | Ziegenfuss | |
| 2009/0278479 A1 | 11/2009 | Platner et al. | |
| 2009/0284155 A1 | 11/2009 | Reed et al. | |
| 2009/0315485 A1 | 12/2009 | Verfuerth et al. | |
| 2010/0001652 A1 | 1/2010 | Damsleth | |
| 2010/0052557 A1 | 3/2010 | Van Der Veen et al. | |
| 2010/0096460 A1 | 4/2010 | Carlson et al. | |
| 2010/0123403 A1 | 5/2010 | Reed | |
| 2010/0164406 A1 | 7/2010 | Kost et al. | |
| 2010/0171442 A1 | 7/2010 | Draper et al. | |

(56) References Cited

U.S. PATENT DOCUMENTS

| | | | |
|---|---|---|---|
| 2010/0244708 A1 | 9/2010 | Cheung et al. | |
| 2010/0259193 A1 | 10/2010 | Umezawa et al. | |
| 2010/0270945 A1 | 10/2010 | Chang et al. | |
| 2010/0271802 A1 | 10/2010 | Recker et al. | |
| 2010/0277082 A1 | 11/2010 | Reed et al. | |
| 2010/0295946 A1* | 11/2010 | Reed et al. | 348/164 |
| 2010/0309310 A1* | 12/2010 | Albright | 348/135 |
| 2010/0309315 A1* | 12/2010 | Hogasten et al. | 348/164 |
| 2010/0328946 A1 | 12/2010 | Borkar et al. | |
| 2011/0001626 A1 | 1/2011 | Yip et al. | |
| 2011/0006703 A1 | 1/2011 | Wu et al. | |
| 2011/0026264 A1 | 2/2011 | Reed et al. | |
| 2011/0204845 A1 | 8/2011 | Paparo et al. | |
| 2011/0215731 A1 | 9/2011 | Jeong et al. | |
| 2011/0221346 A1 | 9/2011 | Lee et al. | |
| 2011/0248812 A1 | 10/2011 | Hu et al. | |
| 2011/0251751 A1 | 10/2011 | Knight | |
| 2011/0310605 A1 | 12/2011 | Renn et al. | |
| 2012/0001566 A1 | 1/2012 | Josefowicz et al. | |
| 2012/0019971 A1 | 1/2012 | Flaherty et al. | |
| 2012/0038490 A1 | 2/2012 | Verfuerth | |
| 2012/0119669 A1 | 5/2012 | Melanson et al. | |
| 2012/0119682 A1 | 5/2012 | Warton | |
| 2012/0143383 A1 | 6/2012 | Cooperrider et al. | |
| 2012/0153854 A1 | 6/2012 | Setomoto et al. | |
| 2012/0169053 A1 | 7/2012 | Tchoryk, Jr. et al. | |
| 2012/0181935 A1 | 7/2012 | Velazquez | |
| 2012/0209755 A1 | 8/2012 | Verfuerth et al. | |
| 2012/0221154 A1 | 8/2012 | Runge | |
| 2012/0224363 A1 | 9/2012 | Van De Ven | |
| 2012/0230584 A1 | 9/2012 | Kubo et al. | |
| 2012/0242254 A1 | 9/2012 | Kim et al. | |
| 2012/0262069 A1 | 10/2012 | Reed | |
| 2013/0033183 A1 | 2/2013 | Verfuerth et al. | |
| 2013/0043792 A1 | 2/2013 | Reed | |
| 2013/0049613 A1 | 2/2013 | Reed | |
| 2013/0126715 A1 | 5/2013 | Flaherty | |
| 2013/0131882 A1 | 5/2013 | Verfuerth et al. | |
| 2013/0141000 A1 | 6/2013 | Wei et al. | |
| 2013/0141010 A1 | 6/2013 | Reed et al. | |
| 2013/0154488 A1 | 6/2013 | Sadwick et al. | |
| 2013/0163243 A1 | 6/2013 | Reed | |
| 2013/0193857 A1 | 8/2013 | Tlachac et al. | |
| 2013/0235202 A1* | 9/2013 | Nagaoka et al. | 348/148 |
| 2013/0249429 A1 | 9/2013 | Woytowitz et al. | |
| 2013/0249479 A1 | 9/2013 | Partovi | |
| 2013/0340353 A1 | 12/2013 | Whiting et al. | |
| 2014/0001961 A1 | 1/2014 | Anderson et al. | |
| 2014/0070964 A1 | 3/2014 | Rupprath et al. | |
| 2014/0078308 A1 | 3/2014 | Verfuerth | |
| 2014/0097759 A1 | 4/2014 | Verfuerth et al. | |
| 2014/0203714 A1 | 7/2014 | Zhang et al. | |
| 2014/0244044 A1 | 8/2014 | Davis et al. | |
| 2014/0265894 A1 | 9/2014 | Weaver | |
| 2014/0265897 A1 | 9/2014 | Taipale et al. | |
| 2014/0313719 A1 | 10/2014 | Wang et al. | |
| 2015/0077019 A1 | 3/2015 | Reed et al. | |
| 2015/0208479 A1 | 7/2015 | Radermacher et al. | |
| 2015/0280782 A1 | 10/2015 | Arbinger et al. | |
| 2015/0312983 A1 | 10/2015 | Hu et al. | |
| 2016/0021713 A1 | 1/2016 | Reed | |

FOREIGN PATENT DOCUMENTS

| | | |
|---|---|---|
| EP | 2 559 937 A1 | 2/2013 |
| EP | 1 459 600 B1 | 2/2014 |
| EP | 2 781 138 A1 | 9/2014 |
| FR | 2 883 306 A1 | 9/2006 |
| JP | 6-335241 A | 12/1994 |
| JP | 2001-333420 A | 11/2001 |
| JP | 2004-279668 A | 10/2004 |
| JP | 2004-320024 A | 11/2004 |
| JP | 2004-349065 A | 12/2004 |
| JP | 2005-93171 A | 4/2005 |
| JP | 2005-198238 A | 7/2005 |
| JP | 2005-310997 A | 11/2005 |
| JP | 2006-179672 A | 7/2006 |
| JP | 2006-244711 A | 9/2006 |
| JP | 2008-59811 A | 3/2008 |
| JP | 2008-509538 A | 3/2008 |
| JP | 2008-130523 A | 6/2008 |
| JP | 2008-159483 A | 7/2008 |
| JP | 2008-177144 A | 7/2008 |
| JP | 2008-529177 A | 7/2008 |
| JP | 2008-535279 A | 8/2008 |
| JP | 2010-504628 A | 2/2010 |
| KR | 10-1150876 B1 | 5/1912 |
| KR | 2005078403 A | 8/2005 |
| KR | 10-2006-0071869 A | 6/2006 |
| KR | 10-2006-0086254 A | 7/2006 |
| KR | 10-2008-0100140 A | 11/2008 |
| KR | 10-2009-0042400 A | 4/2009 |
| KR | 10-0935736 B1 | 1/2010 |
| KR | 20-2010-0007230 U | 7/2010 |
| KR | 10-1001276 B1 | 12/2010 |
| KR | 10-1044224 B1 | 6/2011 |
| WO | 02/076068 A1 | 9/2002 |
| WO | 03/056882 A1 | 7/2003 |
| WO | 2005/003625 A1 | 1/2005 |
| WO | 2006/057866 A2 | 6/2006 |
| WO | 2007/023454 A1 | 3/2007 |
| WO | 2007/036873 A2 | 4/2007 |
| WO | 2008/030450 A2 | 3/2008 |
| WO | 2008/034242 A1 | 3/2008 |
| WO | 2009/040703 A2 | 4/2009 |
| WO | 2011/063302 A2 | 5/2011 |
| WO | 2011/129309 A1 | 10/2011 |
| WO | 2012/006710 A1 | 1/2012 |
| WO | 2012/142115 A2 | 10/2012 |
| WO | 2013/074900 A1 | 5/2013 |
| WO | 2014/018773 A1 | 1/2014 |
| WO | 2014/039683 A1 | 3/2014 |
| WO | 2014/078854 A1 | 5/2014 |

OTHER PUBLICATIONS

Reed et al., "Long-Range Motion Detection for Illumination Control," Amendment filed Apr. 28, 2014, for U.S. Appl. No. 12/784,080, 20 pages.

Reed, "Apparatus and Method of Energy Efficient Illumination," Notice of Allowance mailed Apr. 11, 2014, for U.S. Appl. No. 13/943,537, 9 pages.

Reed, "Apparatus and Method of Energy Efficient Illumination Using Received Signals," Office Action mailed Apr. 23, 2014, for U.S. Appl. No. 13/085,301, 12 pages.

Reed, "Electronic Control to Regulate Power for Solid-State Lighting and Methods Thereof," Office Action mailed Mar. 26, 2014, for U.S. Appl. No. 12/619,535, 16 pages.

International Search Report, mailed Nov. 19, 2013 for PCT/US2013/052092, 4 pages.

International Search Report, mailed Dec. 30, 2013 for PCT/US2013/058266, 3 pages.

Reed, "Apparatus and Method of Energy Efficient Illumination," Office Action mailed Nov. 27, 2013, for U.S. Appl. No. 13/943,537, 8 pages.

Reed, "Apparatus and Method of Energy Efficient Illumination Using Received Signals," Amendment filed Jan. 2, 2014, for U.S. Appl. No. 13/085,301, 26 pages.

Reed, "High Efficiency Power Controller for Luminaire," U.S. Appl. No. 61/905,699, filed Nov. 18, 2013, 5 pages.

Written Opinion, mailed Nov. 19, 2013 for PCT/US2013/052092, 7 pages.

Written Opinion, mailed Dec. 30, 2013 for PCT/US2013/058266, 8 pages.

"Lcd Backlight I/O Ports and Power Protection Circuit Design," dated May 2, 2011, retrieved Jun. 10, 2011, retrieved from http://www.chipoy.info/gadgets/lcd-backlight-i-o-ports-and-power-pr . . . , 4 pages.

EE Herald, "Devices to protect High brightness LED from ESD," dated Mar. 16, 2009, retrieved Jun. 10, 2011, retrieved from http://www.eeherald.com/section/new-products/np100779.html, 1 page.

(56) References Cited

OTHER PUBLICATIONS

International Search Report, mailed Dec. 13, 2010 for PCT/US2010/035649, 3 pages.
International Search Report, mailed Dec. 15, 2010 for PCT/US2010/035658, 3 pages.
International Search Report, mailed Dec. 28, 2010 for PCT/US2010/035651, 3 pages.
International Search Report, mailed Feb. 27, 2013 for PCT/US2012/065476, 3 pages.
International Search Report, mailed Jan. 14, 2013 for PCT/US2012/052009, 3 pages.
International Search Report, mailed Jul. 9, 2009 for PCT/US2009/043171, 5 pages.
International Search Report, mailed Jun. 21, 2010 for PCT/US2009/064625, 3 pages.
International Search Report, mailed Oct. 8, 2012 for PCT/US2012/033059, 3 pages.
International Search Report, mailed Sep. 30, 2011 for PCT/US2011/021359, 3 pages.
Kadirvel et al., "Self-Powered, Ambient Light Sensor Using bq25504," Texas Instruments, Application Report, SLUA629—Jan. 2012, 6 pages.
Littelfuse, "Application Note: Protecting LEDs in Product Designs," 2009, 2 pages.
Panasonic Electronic Components, "LED Lighting Solutions," 2009, 6 pages.
Reed et al., "Adjustable Output Solid-State Lamp With Security Features," U.S. Appl. No. 61/561,616, filed Nov. 18, 2011, 33 pages.
Reed et al., "Apparatus and Method for Schedule Based Operation of a Luminaire" U.S. Appl. No. 13/604,327, filed Sep. 5, 2012, 44 pages.
Reed et al., "Apparatus and Method of Operating a Luminaire," U.S. Appl. No. 13/558,191, filed Jul. 25, 2012, 84 pages.
Reed et al., "Apparatus, Method to Enhance Color Contrast in Phosphor-Based Solid State Lights," U.S. Appl. No. 61/534,722, filed Sep. 14, 2011, 53 pages.
Reed, "Electronic Control to Regulate Power for Solid-State Lighting and Methods Thereof," Office Action mailed Feb. 28, 2013, for U.S. Appl. No. 12/619,535, 17 pages.
Reed, "Electronic Control to Regulate Power for Solid-State Lighting and Methods Thereof," Amendment filed May 24, 2013, for U.S. Appl. No. 12/619,535, 21 pages.
Reed, "Electronic Control to Regulate Power for Solid-State Lighting and Methods Thereof," Office Action mailed Jul. 30, 2013, for U.S. Appl. No. 12/619,535, 15 pages.
Reed, "Electronic Control to Regulate Power for Solid-State Lighting and Methods Thereof," Amendment filed Oct. 30, 2013, for U.S. Appl. No. 12/619,535, 5 pages.
Reed et al., "Gas-Discharge Lamp Replacement," U.S. Appl. No. 61/052,924, filed May 13, 2008, 32 pages.
Reed et al., "Long-Range Motion Detection for Illumination Control," Office Action mailed Dec. 21, 2012, for U.S. Appl. No. 12/784,080, 26 pages.
Reed et al., "Long-Range Motion Detection for Illumination Control," Amendment filed Apr. 22, 2013, for U.S. Appl. No. 12/784,080, 17 pages.
Reed et al., "Long-Range Motion Detection for Illumination Control," Office Action mailed Jul. 22, 2013, for U.S. Appl. No. 12/784,080, 29 pages.
Reed et al., "Long-Range Motion Detection for Illumination Control," Amendment filed Sep. 27, 2013, for U.S. Appl. No. 12/784,080, 20 pages.
Reed et al., "Low-Profile Pathway Illumination System," Amendment filed Jul. 29, 2011, for U.S. Appl. No. 12/437,472, 19 pages.
Reed et al., "Low-Profile Pathway Illumination System," U.S. Appl. No. 61/051,619, filed May 8, 2008, 25 pages.
Reed et al. "Low-Profile Pathway Illumination System" Notice of Allowance, dated Oct. 14, 2011, for U.S. Appl. No. 12/437,472, 9 pages.
Reed et al., "Low-Profile Pathway Illumination System," Office Action, dated May 5, 2011, for U.S. Appl. No. 12/437,472, 24 pages.
Reed et al., "Remotely Adjustable Solid-State Lamp," U.S. Appl. No. 13/875,130, filed May 1, 2013, 65 pages.
Reed et al., "Remotely Adjustable Solid-State Lamp," U.S. Appl. No. 61/641,781, filed May 2, 2012, 65 pages.
Reed et al., "Apparatus, Method to Change Light Source Color Temperature With Reduced Optical Filtering Losses," U.S. Appl. No. 61/295,519, filed Jan. 15, 2010, 35 pages.
Reed et al., "Apparatus, Method to Change Light Source Color Temperature With Reduced Optical Filtering Losses," U.S. Appl. No. 61/406,490, filed Oct. 25, 2010, 46 pages.
Reed et al., "Electrically Isolated Heat Sink for Solid-State Light," U.S. Appl. No. 61/229,435, filed Jul. 29, 2009, 29 pages.
Reed et al., "Gas-Discharge Lamp Replacement With Passive Cooling," U.S. Appl. No. 61/174,913, filed May 1, 2009, 29 pages.
Reed et al., "Long-Range Motion Detection for Illumination Control," U.S. Appl. No. 61/180,017, filed May 20, 2009, 32 pages.
Reed et al., "Turbulent Flow Cooling for Electronic Ballast," U.S. Appl. No. 61/088,651, filed Aug. 13, 2008, 23 pages.
Reed, "Adjustable Output Solid-State Lighting Device," U.S. Appl. No. 61/567,308, filed Dec. 6, 2011, 49 pages.
Reed, "Apparatus and Method of Energy Efficient Illumination Using Received Signals," Office Action mailed Oct. 1, 2013, for U.S. Appl. No. 13/085,301, 11 pages.
Reed, "Electronic Control to Regulate Power for Solid-State Lighting and Methods Thereof," U.S. Appl. No. 61/115,438, filed Nov. 17, 2008, 51 pages.
Reed, "Luminaire With Atmospheric Electrical Activity Detection and Visual Alert Capabilities," U.S. Appl. No. 13/786,114, filed Mar. 5, 2013, 52 pages.
Reed, "Luminaire With Atmospheric Electrical Activity Detection and Visual Alert Capabilities," U.S. Appl. No. 61/649,159, filed Aug. 28, 2012, 52 pages.
Reed, "Luminaire With Switch-Mode Converter Power Monitoring," U.S. Appl. No. 61/723,675, filed Nov. 7, 2012, 73 pages.
Reed, "Luminaire With Switch-Mode Converter Power Monitoring," U.S. Appl. No. 14/074,166, filed Nov. 7, 2013, 73 pages.
Reed, "Photocontrol for Luminaire Consumes Very Low Power," U.S. Appl. No. 61/849,841, filed Jul. 24, 2013, 41 pages.
Reed, "Solid State Hospitality Lamp," U.S. Appl. No. 13/973,696, filed Aug. 22, 2013, 32 pages.
Reed, "Solid State Hospitality Lamp," U.S. Appl. No. 61/692,619, filed Aug. 23, 2012, 32 pages.
Reed, "Solid State Lighting, Drive Circuit and Method of Driving Same," U.S. Appl. No. 13/875,000, filed May 1, 2013, 24 pages.
Reed, "Solid State Lighting, Drive Circuit and Method of Driving Same," U.S. Appl. No. 61/640,963, filed May 1, 2012, 24 pages.
Reed, "Resonant Network for Reduction of Flicker Perception in Solid State Lighting Systems," U.S. Appl. No. 61/527,029, filed Aug. 24, 2011, 41 pages.
Reed, "Resonant Network for Reduction of Flicker Perception in Solid State Lighting Systems," Notice of Allowance mailed Sep. 30, 2013, for U.S. Appl. No. 13/592,590, 9 pages.
Reed, "Apparatus and Method of Energy Efficient Illumination," Amendment filed Apr. 4, 2013, for U.S. Appl. No. 12/784,091, 15 pages.
Reed, "Apparatus and Method of Energy Efficient Illumination," Office Action mailed Apr. 24, 2013, for U.S. Appl. No. 12/784,091, 12 pages.
Reed, "Apparatus and Method of Energy Efficient Illumination," Amendment filed May 14, 2013, for U.S. Appl. No. 12/784,091, 9 pages.
Reed, "Apparatus and Method of Energy Efficient Illumination," Notice of Allowance mailed May 23, 2013, for U.S. Appl. No. 12/784,091, 6 pages.
Reed, "Apparatus and Method of Energy Efficient Illumination," Office Action mailed Dec. 5, 2012, for U.S. Appl. No. 12/784,091, 18 pages.
Reed, "Apparatus and Method of Energy Efficient Illumination," Office Action mailed Dec. 5, 2012, for U.S. Appl. No. 12/784,093, 13 pages.

(56) References Cited

OTHER PUBLICATIONS

Reed, "Apparatus and Method of Energy Efficient Illumination," Amendment filed Apr. 2, 2013, for U.S. Appl. No. 12/784,093, 13 pages.
Reed, "Apparatus and Method of Energy Efficient Illumination," Notice of Allowance mailed Apr. 12, 2013, for U.S. Appl. No. 12/784,093, 9 pages.
Reed, "Apparatus and Method of Energy Efficient Illumination," U.S. Appl. No. 61/333,983, filed May 12, 2010, 57 pages.
Reed, "Apparatus and Method of Energy Efficient Illumination," U.S. Appl. No. 61/346,263, filed May 19, 2010, 67 pages.
Reed, "Apparatus and Method of Energy Efficient Illumination," U.S. Appl. No. 13/943,537, filed Jul. 16, 2013, 67 pages.
Reed, "Electronic Control to Regulate Power for Solid-State Lighting and Methods Thereof," U.S. Appl. No. 61/154,619, filed Feb. 23, 2009, 62 pages.
Reed, "Electrostatic Discharge Protection for Luminaire," Office Action mailed Mar. 15, 2013, for U.S. Appl. No. 13/212,074, 11 pages.
Reed, "Electrostatic Discharge Protection for Luminaire," Amendment filed Jun. 17, 2013, for U.S. Appl. No. 13/212,074, 11 pages.
Reed, "Electrostatic Discharge Protection for Luminaire," Notice of Allowance mailed Sep. 12, 2013, for U.S. Appl. No. 13/212,074, 6 pages.
Reed, "Luminaire With Ambient Sensing and Autonomous Control Capabilities," U.S. Appl. No. 13/786,332, filed Mar. 5, 2013, 86 pages.
Reed, "Luminaire With Ambient Sensing and Autonomous Control Capabilities," U.S. Appl. No. 61/728,150, filed Nov. 19, 2012, 83 pages.
Renesas Electronics, "Zener Diodes for Surge Absorption—Applications of high-intensity LED," Apr. 2010, 1 page.
Renn et al., "Solid State Lighting Device and Method Employing Heat Exchanger Thermally Coupled Circuit Board," U.S. Appl. No. 61/357,421, filed Jun. 22, 2010, 49 pages.
Tyco Electronics, "Circuit Protection," retrieved Jun. 10, 2011, retrieved from http://www.tycoelectronics.com/en/products/circuit-protection.html, 2 pages.
Written Opinion mailed Sep. 30, 2011 for PCT/US2011/021359, 4 pages.
Written Opinion, mailed Dec. 13, 2010 for PCT/US2010/035649, 4 pages.
Written Opinion, mailed Dec. 15, 2010 for PCT/US2010/035658, 3 pages.
Written Opinion, mailed Dec. 28, 2010 for PCT/US2010/035651, 3 pages.
Written Opinion, mailed Feb. 27, 2013, for PCT/US2012/065476, 8 pages.
Written Opinion, mailed Jan. 14, 2013 for PCT/US2012/052009, 5 pages.
Written Opinion, mailed Jul. 9, 2009 for PCT/US2009/043171, 8 pages.
Written Opinion, mailed Jun. 21, 2010 for PCT/US2009/064625, 5 pages.
Written Opinion, mailed Oct. 8, 2012 for PCT/US2012/033059, 3 pages.
Fairchild Semiconductor, "LED Application Design Guide Using Half-Bridge LLC Resonant Converter for 100W Street Lighting," AN-9729, Fairchild Semiconductor Corporation, Rev. 1.0.0, Mar. 22, 2011, 17 pages.
Huang, "Designing an LLC Resonant Half-Bridge Power Converter," 2010 Texas Instruments Power Supply Design Seminar, SEM1900, Topic 3, TI Literature No. SLUP263, Copyright 2010, 2011, Texas Instruments Incorporated, 28 pages.
International Search Report, mailed Feb. 26, 2014, for PCT/US2013/070794, 3 pages.
Poplawski, "Exploring Flicker & LEDs," 2010 DOE SSL Market Introduction Workshop, U.S. Department of Energy, Jul. 22, 2010, 16 pages.

Reed et al., "Adjustable Output Solid-State Lamp With Security Features," Office Action mailed Feb. 27, 2014, for U.S. Appl. No. 13/679,687, 11 pages.
Reed et al., "Long-Range Motion Detection for Illumination Control," Office Action mailed Jan. 30, 2014, for U.S. Appl. No. 12/784,080, 26 pages.
Reed, "Ambient Light Control in Solid State Lamps and Luminaires," U.S. Appl. No. 61/933,733, filed Jan. 30, 2014, 8 pages.
Reed, "Photocontrol for Luminaire Consumes Very Low Power," U.S. Appl. No. 14/158,630, filed Jan. 17, 2014, 71 pages.
Reed, "Systems, Methods, and Apparatuses for Using a High Current Switching Device As a Logic Level Sensor," U.S. Appl. No. 61/764,395, filed Feb. 13, 2013, 48 pages.
Reed, "Systems, Methods, and Apparatuses for Using a High Current Switching Device As a Logic Level Sensor," U.S. Appl. No. 14/179,737, filed Feb. 13, 2014, 48 pages.
Written Opinion, mailed Feb. 26, 2014, for PCT/US2013/070794, 10 pages.
Reed et al., "Adjustable Output Solid-State Lamp With Security Features," Amendment filed Jun. 24, 2014, for U.S. Appl. No. 13/679,687, 11 pages.
Reed et al., "Apparatus and Method for Schedule Based Operation of a Luminaire," Amendment filed Jun. 24, 2014, for U.S. Appl. No. 13/604,327, 14 pages.
Reed et al., "Apparatus and Method for Schedule Based Operation of a Luminaire," Notice of Allowance mailed Jul. 7, 2014, for U.S. Appl. No. 13/604,327, 8 pages.
Reed et al., "Long-Range Motion Detection for Illumination Control," Notice of Allowance mailed Jun. 20, 2014, for U.S. Appl. No. 12/784,080, 7 pages.
Reed, "Apparatus and Method of Energy Efficient Illumination," U.S. Appl. No. 14/329,508, filed Jul. 11, 2014, 61 pages.
Reed, "Apparatus and Method of Energy Efficient Illumination Using Received Signals," Amendment filed Jul. 23, 2014, for U.S. Appl. No. 13/085,301, 12 pages.
Reed, "Electronic Control to Regulate Power for Solid-State Lighting and Methods Thereof," Amendment filed May 27, 2014, for U.S. Appl. No. 12/619,535, 22 pages.
Reed, "Luminaire With Atmospheric Electrical Activity Detection and Visual Alert Capabilities," Notice of Allowance mailed Jul. 1, 2014, for U.S. Appl. No. 13/786,114, 9 pages.
Extended European Search Report, dated Aug. 13, 2014, for corresponding European Application No. 09826926.9, 8 pages.
International Search Report mailed Nov. 11, 2014, for International Application No. PCT/US2014/047867, 3 pages.
Reed et al., "Adjustable Output Solid-State Lamp With Security Features," Notice of Allowance mailed Aug. 29, 2014, for U.S. Appl. No. 13/679,687, 9 pages.
Reed, "Apparatus and Method of Energy Efficient Illumination," Office Action mailed Aug. 28, 2014, for U.S. Appl. No. 14/329,508, 8 pages.
Reed, "Apparatus and Method of Energy Efficient Illumination," Amendment filed Sep. 30, 2014, for U.S. Appl. No. 14/329,508, 18 pages.
Reed, "Apparatus and Method of Energy Efficient Illumination," Notice of Allowance mailed Nov. 5, 2014, for U.S. Appl. No. 14/329,508, 10 pages.
Reed, "Apparatus and Method of Energy Efficient Illumination Using Received Signals," Notice of Allowance mailed Jul. 30, 2014, for U.S. Appl. No. 13/085,301, 5 pages.
Reed, "Apparatus and Method of Energy Efficient Illumination Using Received Signals," U.S. Appl. No. 14/557,275, filed Dec. 1, 2014, 92 pages.
Reed, "Electronic Control to Regulate Power for Solid-State Lighting and Methods Thereof," Office Action mailed Aug. 14, 2014, for U.S. Appl. No. 12/619,535, 16 pages.
Reed, "High Efficiency Power Controller for Luminaire," U.S. Appl. No. 14/546,354, filed Nov. 18, 2014, 33 pages.
Written Opinion mailed Nov. 11, 2014, for International Application No. PCT/US2014/047867, 5 pages.
Japanese Office Action, dated Jan. 6, 2015, for corresponding Japanese Application No. 2011-536564, 6 pages.

(56) References Cited

OTHER PUBLICATIONS

Reed et al., "Apparatus and Method of Operating a Luminaire," Office Action mailed Dec. 22, 2014, for U.S. Appl. No. 13/558,191, 17 pages.
Reed, "Adjustable Output Solid-State Lighting Device," Office Acton mailed Jan. 2, 2015, for U.S. Appl. No. 13/707,123, 24 pages.
Reed, "Luminaire With Ambient Sensing and Autonomous Control Capabilities," Office Action mailed Dec. 17, 2014, for U.S. Appl. No. 13/786,332, 20 pages.
Extended European Search Report, dated Apr. 11, 2016, for corresponding European Application No. 16152644.7, 8 pages.
Extended European Search Report, dated May 3, 2016, for corresponding European Application No. 12771286.7, 9 pages.
Reed, "Electronic Control to Regulate Power for Solid-State Lighting and Methods Thereof," Office Action mailed May 9, 2016 for U.S. Appl. No. 14/806,500, 18 pages.
Reed, "High Efficiency Power Controller for Luminaire," Notice of Allowance mailed Apr. 11, 2016, for U.S. Appl. No. 14/546,354, 5 pages.
Reed, "Low Power Photocontrol for Luminaire," Office Action mailed Apr. 27, 2016, for U.S. Appl. No. 14/844,944, 10 pages.
Reed, "Solid State Hospitality Lamp," Office Action mailed Apr. 15, 2016, for U.S. Appl. No. 13/973,696, 11 pages.
Extended European Search Report, dated Oct. 15, 2015, for corresponding European Application No. 12825132.9-1802, 5 pages.
Extended European Search Report, dated Sep. 28, 2015, for corresponding European Application No. 12850159.0-1802, 6 pages.
Extended European Search Report dated Oct. 21, 2015, for corresponding EP Application No. 13835001.2-1802, 7 pages.
Extended European Search Report dated Jan. 4, 2016, for corresponding EP Application No. 13823055.2-1802, 7 pages.
International Search Report and Written Opinion, mailed May 7, 2015, for corresponding International Application No. PCT/US2015/013512, 15 pages.
Korean Office Action with English Translation, dated Nov. 18, 2015, for corresponding KR Application No. 10-2011-7014088, 14 pages.
Reed et al., "Apparatus and Method for Schedule Based Operations of a Luminaire," Office Action mailed Mar. 2, 2015, for U.S. Appl. No. 14/552,274, 7 pages.
Reed et al., "Apparatus and Method for Schedule Based Operation of a Luminaire" Amendment filed Jun. 1, 2015, for U.S. Appl. No. 14/552,274, 14 pages.
Reed et al., "Apparatus and Method for Schedule Based Operation of a Luminaire" Notice of Allowance mailed Jun. 19, 2015, for U.S. Appl. No. 14/552,274, 9 pages.
Reed et al., "Apparatus and Method of Operating a Luminaire," Amendment filed Mar. 19, 2015, for U.S. Appl. No. 13/558,191, 20 pages.
Reed et al., "Apparatus and Method of Operating a Luminaire," Notice of Allowance mailed Apr. 27, 2015, for U.S. Appl. No. 13/558,191, 8 pages.
Reed et al., "Long-Range Motion Detection for Illumination Control,"Office Action mailed Sep. 17, 2015, for U.S. Appl. No. 14/500,512, 17 pages.
Reed et al., "Long-Range Motion Detection for Illumination Control," Amendment filed Dec. 10, 2015, for U.S. Appl. No. 14/500,512, 18 pages.

Reed et al., "Long-Range Motion Detection for Illumination Control," Final Office Action mailed Mar. 4, 2016, for U.S. Appl. No. 14/500,512, 20 pages.
Reed et al., "Remotely Adjustable Solid-State Lamp," Amendment filed Apr. 1, 2015, for U.S. Appl. No. 13/875,130, 14 pages.
Reed et al., "Remotely Adjustable Solid-State Lamp," Office Action mailed Apr. 21, 2015, for U.S. Appl. No. 13/875,130, 10 pages.
Reed et al., "Remotely Adjustable Solid-State Lamp," Amendment filed Jul. 20, 2015, for U.S. Appl. No. 13/875,130, 15 pages.
Reed et al., "Remotely Adjustable Solid-State Lamp," Corrected Notice of Allowance, mailed Aug. 12, 2015, and Notice of Allowance, mailed Jul. 31, 2015 for U.S. Appl. No. 13/875,130, 11 pages.
Reed, "Adjustable Output Solid-State Lighting Device," Amendment filed Apr. 2, 2015, for U.S. Appl. No. 13/707,123, 14 pages.
Reed, "Adjustable Output Solid-State Lighting Device," Office Action mailed Oct. 5, 2015, for U.S. Appl. No. 13/707,123, 24 pages.
Reed, "Adjustable Output Solid-State Lighting Device," Amendment filed Jan. 8, 2016, for U.S. Appl. No. 13/707,123, 11 pages.
Reed, "Adjustable Output Solid-State Lighting Device," Notice of Allowance mailed Feb. 25, 2016, for U.S. Appl. No. 13/707,123, 9 pages.
Reed, "Ambient Light Control in Solid State Lamps and Luminaires," U.S. Appl. No. 14/609,168, filed Jan. 29, 2015, 77 pages.
Reed, "Ambient Light Control in Solid State Lamps and Luminaires," Amendment filed Jan. 29, 2015, for U.S. Appl. No. 14/609,168, 12 pages.
Reed, "Electronic Control to Regulate Power for Solid-State Lighting and Methods Thereof," Notice of Allowance mailed Apr. 23, 2015, for U.S. Appl. No. 12/619,535, 8 pages.
Reed, "High Efficiency Power Controller for Luminaire," Office Action mailed Sep. 10, 2015, for U.S. Appl. No. 14/546,354, 15 pages.
Reed, "High Efficiency Power Controller for Luminaire," Amendment filed Feb. 9, 2016, for U.S. Appl. No. 14/546,354, 11 pages.
Reed, "Low Power Photocontrol for Luminaire," U.S. Appl. No. 14/994,569, filed Jan. 13, 2016, 36 pages.
Reed, "Low Power Photocontrol for Luminaire," U.S. Appl. No. 14/844,944, filed Sep. 3, 2015, 45 pages.
Reed et al., "Luminaire With Adjustable Illumination Pattern," U.S. Appl. No. 14/939,856, filed Nov. 12, 2015, 69 pages.
Reed, "Luminaire With Ambient Sensing and Autonomous Control Capabilities," Amendment filed Mar. 13, 2015, for U.S. Appl. No. 13/786,332, 23 pages.
Reed, "Luminaire With Switch-Mode Converter Power Monitoring," Notice of Allowance mailed Nov. 18, 2015, for U.S. Appl. No. 14/074,166, 9 pages.
Reed, "Solid State Lighting, Drive Circuit and Method of Driving Same," Notice of Allowance Mailed Aug. 4, 2015, for U.S. Appl. No. 13/875,000, 10 pages.
Reed, "Systems, Methods, and Apparatuses for Using a High Current Switching Device as a Logic Level Sensor," Notice of Allowance for U.S. Appl. No. 14/179,737, mailed Nov. 6, 2015, 9 pages.
Korean Office Action with English Translation, dated May 16, 2016, for corresponding KR Application No. 10-2011-7014088, 22 pages.

* cited by examiner

SYSTEMS AND METHODS THAT EMPLOY OBJECT RECOGNITION

BACKGROUND

Technical Field

The present disclosure generally relates to the field of illumination devices and, more particularly, to the control of illumination levels of illumination devices.

Description of the Related Art

Energy conservation through the efficient usage of energy has become an important topic in recent years. Efficient usage of energy can result in a multitude of benefits, including financial benefits such as cost savings and environmental benefits such as preservation of natural resources and the environment. In the context of light systems, efficient energy usage by a lighting system is perhaps most effectively accomplished by reducing the illumination level when a high illumination level is not needed. This can be achieved manually by a user of the lighting system or, more conveniently, by some sort of automatic control mechanism that adjust the illumination level according to changes in certain environmental characteristics.

One conventional approach to automatic control of illumination level of lighting systems is to use a passive infrared (PIR) sensor to detect the presence of a human, indicative of the need of lighting. For example, the PIR sensor can be used to provide full power to a lamp when heat emitted by a human body is detected. PIR sensors, however, are not an ideal solution. This is because PIR sensors generally have a very short sensing range with a maximum sensing range of 10 meters typically. Many light poles are 10 meters tall, yet a PIR sensor in a lamp installed on top of a light pole needs to have a detection range much longer than the pole height in order to detect the presence of a person or a heat-emitting object at the periphery of the lighting area. Otherwise, the benefit of using a PIR sensor to automatically control the illumination level under such circumstances would likely be diminished. In addition, PIR sensors require a substantial difference between body temperature and the background ambient temperature for optimal sensitivity. Accordingly, at ambient temperatures approaching the normal temperature of a human body, PIR sensors tend to exhibit reduced sensitivity and thus effectively have a shortened detection range. Furthermore, PIR sensors typically cannot detect objects that are at ambient temperature, such as a door opening for example, although such an event usually indicates the approach of a person and is desirable to detect.

BRIEF SUMMARY

An illumination system may be summarized as including a light source operable to provide at least two levels of illumination; a two-dimensional non-Passive Infrared (non-PIR) imager operable to image an area and to produce image data representative of the images across at least part of a visible portion of an electromagnetic spectrum; and a controller communicatively coupled to receive the image data from the non-PIR imager, the controller configured to process the received image data to detect at least one ambient environmental characteristic of the area in the part of the visible portion of the electromagnetic spectrum where the ambient environmental characteristic is indicative of a presence or imminent presence of a body in the area, and the controller coupled to control operation of the light source based on at least in part detection of the ambient characteristic of the environment. The controller may be configured to adjust the level of illumination provide by the light source based on at least in part the detection of the ambient environmental characteristic that is indicative of a presence or imminent presence of a body in the area. The controller may be configured to cause the light source device to provide illumination at a first illumination level when the image data indicates no motion detected and to provide illumination at a second illumination level when the image data is indicative of motion, the second illumination level greater than the first illumination level. The non-PIR imager may capture a first image of the area at a first time and may capture a second image of the area at a second time, after the first time, each of the first and the second images having a respective plurality of pixels, and wherein the controller compares the image data representative of the first and the second images to detect an appearance or a change between the first and the second images. The controller may adjust an illumination level of the light source from a first illumination level to a second illumination level, that is different from the first illumination level, when the image data representative of the first image and the image data representative of the second image differ by more than a threshold amount. The controller may adjust an illumination level of the light source from a first illumination level to a second illumination level, that is different from the first illumination level, when the image data representative of the first image and the image data representative of the second image differ by more than a threshold amount and when a quantity of the pixels that have changed and that are within a threshold distance from one another is greater than a threshold quantity.

The illumination system may further include a photosensor coupled to provide a signal to the controller indicative of a level ambient light sensed by the photosensor, wherein the controller is configured to adjust the illumination level of the light source based on the level of ambient light level sensed by the photosensor.

The illumination system may further include a clock that provides a clock signal indicative of a time to the controller, wherein the controller causes adjusts the level of illumination from the light source in response to the clock signal. The controller may be further configured to vary a gain setting of the non-PIR imager in response to a signal indicative of a level of ambient brightness. The controller may be configured to deduct the level of illumination provide by the light source from a detected level of ambient brightness and adjust the illumination level provided by the light source in response to the deduction. The controller may adjust the level of illumination from the light source a defined delay period after detecting the ambient environmental characteristic. The at least one ambient environment characteristic may be indicative of a motion in the area. The control device may include at least one of a switch, a potentiometer, an optical sensor, or an input port communicatively coupled to program the controller. The controller may be programmable via an image of a machine-readable symbol imaged by the non-PIR imager. The controller may be configured to adjust the level of illumination level from the light source at a rate at which a level of ambient light is changing.

The illumination system may further include a communication device coupled to the non-PIR imager to receive the image data and operable to transmit the image data using at least one of an Ethernet protocol, an RS-485 protocol, or a wireless communication protocol. The non-PIR imager may include at least one of a solid-state camera, a video camera, or a digital still camera and the light source, non-PIR imager and controller are part of a light fixture that is mountable to an indoor or outdoor structure. An area illuminated by the illumination device may be at least approximately coincident with the area imaged by the non-PIR imager.

A method of controlling a light source may be summarized as including imaging an area with a non-Passive Infrared (non-PIR) imager to produce image data representative of at least part of a visible portion of an electromagnetic spectrum; processing by a processor the image data from the non-PIR imager to detect at least one ambient environmental characteristic of the area that is indicative of a movement in the area; and in response to the detection, adjusting a level of illumination provided to the area from an light source. Imaging an area with an non-PIR imager may include recording data representative of a first image of at least a portion of the area at a first time and recording data representative of a second image of at least the portion of the area at a second time after the first moment in time, wherein processing by a processor the image data to detect at least one ambient environmental characteristic of the area includes comparing the data representative of the first image and the data representative of the second image to detect the movement in the area; and wherein adjusting a level of illumination provided to the area from an light source includes illuminating the area at a first illumination level and then illuminating the area at a second illumination level different from the first illumination level. Comparing the data representative of the first image and the data representative of the second image to detect the movement in the area may include determining whether or not at least a threshold number of pixels in the first and the second images have changed by at least a threshold amount in at least one aspect from the first image to the second image and whether or not each of the pixels that have changed by at least the threshold amount is within a threshold distance from one another. Imaging an area with an non-PIR imager may include receiving data representative of pixels of a first image of the area at a first time and receiving data representative of pixels of a second image of the area at a second time after the first time, wherein processing by a processor the image data to detect at least one ambient environmental characteristic of the area includes comparing the data representative of the pixels of the first image with the data representative of the pixels of the second image to identify pixels that have changed in at least one aspect by more than a threshold amount between the first and the second images, determining a quantity of the pixels that have changed by more than the threshold amount and are within a threshold distance from other pixels that have changed by more than the threshold amount, and generating a first signal indicative of the detection of movement if the quantity of the changed pixels is greater than a threshold quantity.

The method may further include determining whether a present time is during a period of daylight hours; and terminating illumination of the area by the light source when the present time is determined to be during the period of daylight hours.

The method may further include determining a level of ambient light in the area; illuminating the area at a first level of illumination in response to both the determined level of ambient light in the area being below an ambient light threshold and no movement being detected; illuminating the area at a second level of illumination in response to both the determined ambient light level in the area being below the ambient light threshold and movement being detected; and terminating illumination of the area by the light source in response to the determined ambient light level being at least equal to the ambient light threshold. Determining a level of ambient light in the area may include sensing a total level of light in the area; and deducting a current level of illumination being provided by the light source from the sensed total level of light in the area.

Figure 1:
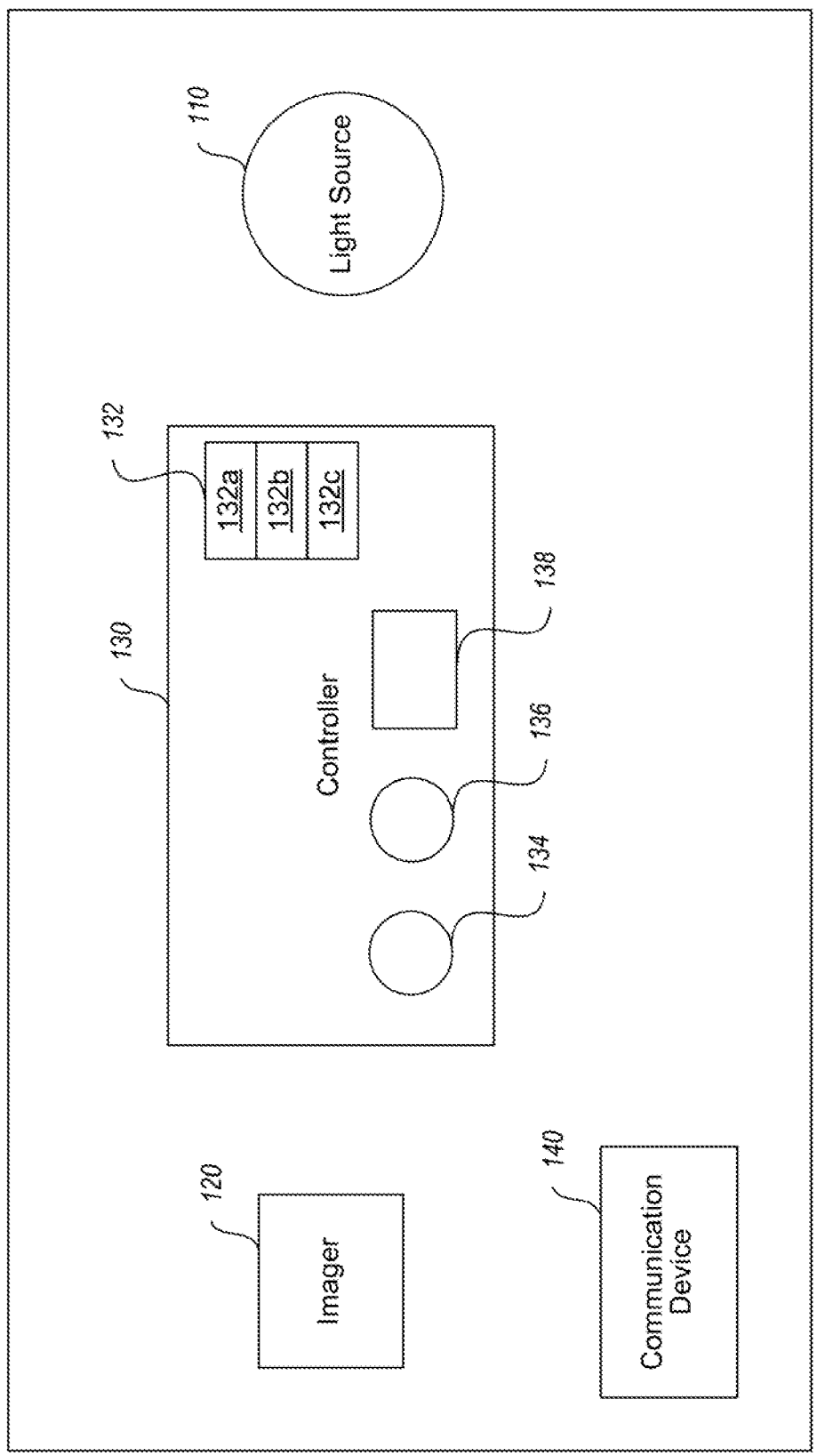
FIG. 1 is a diagram showing an illumination system according to one non-limiting illustrated embodiment.

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn, are not intended to convey any information regarding the actual shape of the particular elements, and have been solely selected for ease of recognition in the drawings.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with luminaires and imaging devices have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense that is as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The headings and Abstract of the Disclosure provided herein are for convenience only and do not interpret the scope or meaning of the embodiments.

FIG. 1 illustrates an illumination system 100 according to one non-limiting illustrated embodiment. The illumination system 100 includes a light source 110, a non-Passive Infrared (non-PIR) imager 120 and a controller 130. The light source 110 illuminates when electric power is provided to the light source 110 and the illumination level of the light source 110 may be adjusted by adjusting the electric power provided. The light source 110 is capable of being in at least three states, an OFF state providing no illumination, and at least two ON states providing at least two respective levels of illumination, e.g., a low level of illumination and a high level of illumination, when powered to illuminate. The light source 110 may include any type of light emitter, including incandescent lamp, fluorescent lamp, arc lamp, or gas-discharge lamp, although a solid-state light emitter may be preferred, such as one or more light-emitting diodes. When powered, the light source 110 provides illumination to an area at, below, above or adjacent where the illumination system 100 is located depending on whether and how light emitted by the light source 110 is directed.

The non-PIR imager 120 is a two-dimensional imager that images an area to produce data representative of two-dimensional images across at least part of a visible portion of an electromagnetic spectrum. That is, the non-PIR imager 120 captures images in the visible range of the electromagnetic spectrum, which is different from the infrared range of the electromagnetic spectrum. The non-PIR imager 120 may, for example, be a digital image sensor that converts an optical image to electrical signals that may be stored as digital data representative of a plurality of pixels of the image. For example, the non-PIR imager 120 may be a camera such as, for example, a solid-state camera, digital still camera, "board" camera, digital video camera, or analog video camera coupled to a frame grabber. The gain setting of the non-PIR imager 120 is adjustable. For example, when the ambient light level is low the non-PIR imager 120 has a high gain setting and when the ambient light level is high the non-PIR imager 120 has a low gain setting. Accordingly, the ambient light level may be determined based on the gain setting of the non-PIR imager 120. The non-PIR imager 120 includes a lens in one embodiment.

The controller 130 is communicatively coupled to receive image data from the non-PIR imager 120 to control operations of the light source 110 based on the image data. In particular, the controller 130 processes the received image data to detect at least one ambient environmental characteristic of the area in the part of the visible portion of the electromagnetic spectrum where the ambient environmental characteristic indicates the presence or imminent presence of a defined type of object in the area, such as a vehicle or a human, for example. As described herein, such may advantageously employ machine-vision object recognition techniques in place or, or in addition to motion sensing techniques. The controller 130 controls operations of the light source 110, including activation, deactivation and adjustment of the illumination level of the light source 110, based on, at least in part, the detection of objects in the area with visual features that are machine-recognized as corresponding to one of a number of defined objects. In one embodiment, the controller 130 is configured to cause the light source device to provide illumination at a first illumination level when the image data indicates no motion detected and to provide illumination at a second illumination level when the image data is indicative of motion, the second illumination level greater than the first illumination level.

In one embodiment, the non-PIR imager 120 captures images of the area from time to time. Each of the images has a respective plurality of pixels. The controller 130 then process the image data representative of the images to detect an appearance of objects in the area with visual features matching defined features, and adjusts illumination level of the light source 110 accordingly. In one embodiment, the controller 130 adjusts an illumination level of the light source 110 from a first illumination level to a second illumination level, different from the first illumination level (e.g., higher than the first illumination level), when the image data indicates the presence in the area of a defined type of object, for example the presence of a vehicle (e.g., automobile, truck, bus, train, aircraft, ship, boat) or the presence of a human.

Optionally, the controller 130 may also compare successive images to detect a change which occurs in the area, and adjust illumination level of the light source 110 accordingly. For example, the controller 130 may detect the initial appearance of a defined type of object or the departure of the defined type of object from the area. The controller 130 may be configured to start a timer based on the detection of a change, for instance starting a timer when a vehicle initially appears in the image of the area. The controller 130 may adjust the level of illumination based at least in part of the timer. For example, the controller may increase an illumination level provided by the light source 110 in response to detection of the appearance of a vehicle in the area (e.g., parking lot, freight yard), and automatically decrease the level of illumination or even turn OFF the light source 110 at a defined time period after the initial appearance of the defined type of object. The controller 130 may, for example, reset the timer if movement of the detected defined type of object occurs within the defined time period. Additionally, or alternatively, the controller 130 may, for example, reset the timer if some other defined object is detected in the area during the defined time period.

When comparing successive images, the controller 130 may determine whether the image data representative of the first image and the image data representative of the second image differ by more than a threshold amount. The controller 130 determines movement has occurred when the image data representative of the first image and the image data representative of the second image differ by more than a threshold amount and when a quantity of the pixels that have changed between the successive images and that are within a threshold distance from one another is greater than a threshold quantity. Thus, in order for the controller 130 to determine there is motion of the defined type of object in the area, a sufficient number of pixels need to have changed by more than a threshold amount in at least one aspect, from the first image to the second image, and that these pixels need to be within a threshold distance from one another. This ensures that motion detection is based on motion of the object, such as a vehicle or a person, and not based on noise in the electrical signals representative of the pixels, for example.

In one embodiment, the controller 130 is capable of detecting objects at a distance of at least 25 meters away from the non-PIR imager 120 using images captured by the non-PIR imager 120. This allows the illumination system 100 to be installed on a typical 10-meter-tall light pole and still be able to detect motion that occurs more than 20 meters from the base of the light pole.

The controller 130 has a memory 132 that may be used to store data, including the captured images from the non-PIR imager 120. The memory 132 may include a plurality of memory areas, such as the memory areas 132a, 132b and 132c shown in FIG. 1, although the memory 132 may have a different number of memory areas in other embodiments. In one embodiment, the controller 130 stores in the memory area 132a a first image captured by the non-PIR imager 120 at a first moment in time, stores in the memory area 132b a second image captured by the non-PIR imager 120 at a second moment in time that is after the first moment in time.

The controller 130 executes a number of image analysis techniques to determine whether the image(s) include sets of pixels that represent a defined type of objects. For example, the controller 130 may employ any of a large variety of feature detection techniques to identify features (e.g., edges, corners or interest points, blobs or regions of interest, ridges) in an image. For instance, the controller 130 may employ various edge detection algorithms, for instance Sobel edge filtering, Prewitt gradient edge detection, Roberts Cross edge detection, Canny edge detection, zero crossing edge detection and/or line detection to determine whether some of the pixels in an image correspond to a set of visual features representative of an particular type of object, for example any type of motor vehicle, or a specific type of motor vehicle (e.g., a truck versus a car), or a specific make and model of motor vehicle (e.g., Ford F-150).

The visual features may, for example, include edges that correspond to an outline or silhouette of an object. Thus, edge detection algorithms may be executed by one or more processors (e.g., microprocessor, digital signal processor, application specific integrated circuit, programmable gate array, programmed logic controller), to detect edges or other features. The processor may computationally compare the detected edges and/or other features to defined sets of edges and/or other features to determine if a match exists, and optionally the extent of any match. The defined sets of edges and/or other feature may represent those visually distinct features associated with a particular type of object, for example a motor vehicle, a type of motor vehicle (e.g., automobile, truck, bus, motorcycle), or even a specific make and model of motor vehicle. Image processing may also automatically locate a license plate carried by a motor vehicle an read the characters from the license plate. Such may also discern the governmental authority that issued the license plate, for example by reading identifying information from the license plate and/or by assessing one or more colors of the license plate.

The visual features may additionally or alternatively include other visually distinctive aspects associated with the type of object. For example, the distinctive visual aspect may include lights on the object. For instance, headlights and/or taillights of a vehicle may be recognizable by the controller 130 in an image. Such may include accounting for a total number of lights expected (e.g., two, dependent on point of view) and or an expected relative position and/or spacing between the lights (e.g., between a pair of lights). The relative position may be represented along one, two or three axes, and may include orientation about one or more axes, thus may sometimes be referred to herein as pose. The relative position and/or spacing may be defined in terms of a range of distances to account for different sized vehicles (e.g., expected range of automobiles and/or trucks or buses). The spacing may also account for expected spacing based on point of view. For instance, a spacing between two headlights in a front view of an automobile is likely different than a spacing between the same headlights in a different view, such as an isometric top, front view. Also for instance, a spacing between two headlights in a front view of an automobile is likely different than a spacing between lights visible in a side view of the same automobile. Thus, spacing cannot only account for expected variation between different types of motor vehicles, but also account for variation between different features of a particular motor vehicle, and different views of the same motor vehicle.

Also for example, the distinctive visual aspect may be a reflectance pattern. For instance, the controller 130 may recognize a vehicle based on an appearance of a large polygonal area, corresponding to a windshield, rear window or side windows of a vehicle, surrounded or bounded by another polygonal area with a second, different reflectance, the second polygonal area corresponding to the body of the motor vehicle. As further examples, the controller 130 may recognize a general size or even color. In recognizing size, the controller 130 may perform a normalization to account for distance of the possible object from the non-PIR imager 120. Normalization may include comparison to other objects in the image which are at fixed distances and the dimensions of which have been defined to the controller. Normalization may employ angular measurements between various features, which inherently account for variation in the normal (i.e., right angle) distance from the non-PIR imager 120.

Where motion detection is employed in addition to object recognition, the controller 130 may compare the first and the second images to determine whether or not there is motion of a defined type of object in the area which the images captured by the non-PIR imager 120 represent.

A motion detection algorithm utilized by the controller 130 may determine there is motion in the area when the data representative of the pixels of the first image and the data representative of the pixels of the second image differ by more than a threshold amount in at least one aspect, such as chrominance or luminance, for example. When a defined type of object is recognized and the data representative of the pixels of the first image and the data representative of the pixels of the second image differ by less than a threshold amount, indicating no motion in the area, the controller 130 causes the light source 110 to illuminate at a first illumination level (e.g., relatively low). When the defined type of object is recognized and the data representative of the pixels of the first image and the data representative of the pixels of the second image differ by more than a threshold amount, indicating motion in the area, the controller 130 may cause the light source 110 to illuminate at a second illumination level that is higher than the first illumination level. For example, the illumination level of the light source 110 may initially be set to a low level, just sufficient for the non-PIR imager 120 to capture discernible images. When a defined type of object is detected in the image of the area, the controller 130 may adjust the illumination level of the light source 110 to be set to a high level that is appropriate for the area that is illuminated. The controller 130 may then monitor the images to determine whether the detected object moves. The controller 130 may reduce the level of illumination if movement of the detected object is not detected after some defined period of time, or leave the level of illumination at the higher level for an extended period if movement of the detected object is not detected. In one embodiment, the first illumination level is approximately 10% of the full illumination rating of the light source 110, and the second illumination level is approximately the full illumination rating of the light source 110. Alternatively, the first illumination level is a low illumination level that is determined based on the sensitivity of the particular imaging device 110 at use, and the second illumination level is an illumination level higher than the first illumination level.

The motion detection algorithm may take into account an additional criterion. That is, motion is detected not only because the data representative of the pixels of the first image and the data representative of the pixels of the second image differ by more than a threshold amount, but also because the quantity of the pixels that have changed from the first image to the second image and that are within a threshold distance from other pixels that have changed is greater than a threshold quantity. For example, the locations of the pixels that have changed by more than the threshold amount are stored in memory area 132c. The locations of such pixels are compared to one another and the quantity of such pixels is counted to determine whether there is motion in the area. Thus, in order for the controller 130 to determine there is motion of the detected object (e.g., vehicle) or some other object (e.g., human) in the area, a sufficient number of pixels need to have changed by more than a threshold amount in at least one aspect, from the first image to the second image, and that these pixels need to be within a threshold distance from one another. This ensures that motion detection is based on motion of an object, such as a vehicle or person, and not based on noise in the electrical signals representative of the pixels, for example.

The controller 130 is capable of determining a present time of the day or an ambient light level to adjust the illumination level of the light source 110 accordingly. For example, the controller 130 may include a photosensor 134 that converts sensed electromagnetic energy, such as daylight or ambient light, into a corresponding electrical signal. The controller 130 can adjust the sensor gain or sensitivity of the photosensor 134 in one embodiment. Alternatively, the controller 130 may include a real-time clock 136. Alternatively, the controller 130 includes both the photosensor 134 and the real-time clock 136. Alternatively or additionally, the controller 130 may sense an amount of ambient light as detected by the non-PIR imager 120. The controller 130 therefore determines whether or not illumination by the light source 110 is necessary, based on at least one of the ambient light level sensed by the photosensor 134, the present time as indicated by the real-time clock 136 and the gain setting of the non-PIR imager 120, or any combination thereof. The controller 130 may deactivate or turn OFF the light source 110, when the controller 130 determines that the present time is during daylight hours or that the ambient light level is above an ambient light threshold.

As the controller 130 is capable of determining the present time of the day and/or ambient light conditions, the controller 130 may adjust the illumination level of the light source 110 based on the determined present time, ambient light conditions (e.g., dusk/dawn sensing), and/or motion detection. In one embodiment, depending on what the present time of the day is as determined by the controller 130 or what the ambient light level is, the illumination level of the light source 110 is adjusted accordingly by the controller 130. For example, the light source 110 may be turned OFF when the present time is determined to be 11:00 am, at which time illumination of the area by the light source 110 is usually not necessary. Further, the illumination level of the light source 110 may be set to a relatively low level when the present time is determined to be, for example, 4:30 pm, when it might begin to get dark especially during winter times, and set to a relatively high level when the present time is determined to be, for example, 10:00 pm. In another example, the controller 130 causes the light source 110 to illuminate at the first illumination level when the ambient light level is less than the ambient light threshold. The controller 130 may store the state of the light source 110, such as the illumination level, in the memory 132 and deducts this artificial illumination level from the sensed ambient light level. This enables the controller 130 to detect when daylight occurs even if the light source 110 is illuminating at its full illumination rating. When daylight is determined to be above the ambient light threshold, the controller 130 may deactivate, or turn OFF, the light source 110 to conserve energy.

Appropriate time delays may be added before the light source 110 is activated or deactivated. During these delays the state of daylight or night must remain constant or the controller 130 starts the time delay again. This suppresses short-term noise events and thereby avoids the controller 130 from being falsely triggered to activate the light source 110 due to short-term events such as vehicle headlights or a transient moving object.

The controller 130 may be programmable and includes an input port 138 through which a user can program the controller 130. For example, the controller 130 may be programmed to recognize new patterns, corresponding to new defined types of objects to be detected, or to remove previously programmed patterns corresponding to previously programmed defined types of objects. Also for example, the time delays and the various illumination levels of the light source 110 as adjusted by the controller 130 may be programmed. The input port 138 may include switches and/or potentiometers that can be set to program the controller 130. Alternatively, the input port 138 may include an electrical interface for the user to remotely program the controller 130 whether through a wire or wirelessly. The controller 130 may optionally be programmable optically via one or more images captured by the non-PIR imager 120. For example, machine-readable symbols (e.g., barcode or two-dimensional machine-readable symbols) may be used to program the controller, for example to set delay times and other parameters used by the controller 130. A machine-readable symbol carried on a substrate may be held in the field of view of the non-PIR imager 120, which captures the image of the machine-readable symbol. The controller 130 may use standard machine-readable symbol decoding software to determine and store the value represented by the machine-readable symbol(s). Any machine-readable symbol symbologymay be used in this method, including one- or linear symbologies or two-dimensional symbologies, as commonly used in the package shipping industry. The controller 130 may also receive a one-bit input via the input port 138 to activate or deactivate the light source 110. For example, a binary bit of "0" turns OFF the light source 110 and a binary bit of "1" turns ON the light source 110.

Optionally, the controller 130 may be programmed to turn ON the light source 110 after dark to illuminate at a high level for a programmed length of time, two hours for example, and to decrease the illumination level to a lower level after the programmed length of time. For example, in a corporation parking lot setting, illumination of the parking lot is provided during a period of time after dark when employees are expected to leave for home and the illumination is provided independent of or without motion detection. The controller 130 may be programmed to cause the light source 110 to illuminate at the same or a different high level for a programmed length of time before daylight. For example, illumination of the parking lot is again provided during a period of time before daylight when employees are expected to come to work and the illumination is provided independent of or without motion detection. In between such periods, the controller 130 may be programmed to increase the level of illumination in response to detecting a defined type of object in an image of the area.

The controller 130 may sample ambient light levels through the photosensor 134 at specified intervals to adjust the illumination level of the light source 110 at a predetermined rate that is similar to the rate at which natural illumination increases as daylight approaches and decreases as daylight fades away. This prevents the light source 110 from being turned OFF by accident or intentional illumination by light sources such as headlamps or flashlights. Such feature renders the illumination system 100 resistant to criminals attempting to deactivate the light source 110 by the use of artificial light sources. An additional security feature is the use of the solar time of day to ensure that the controller 130 will cause the light source 110 to stay ON during night time. The solar time of day may be provided by the real-time clock 136. Alternatively, the solar time of day is computed by detecting dusk and dawn on successive days and setting the 24:00 hour to be at the middle of the dusk to dawn period. By adjusting the logical dusk and dawn times with a time constant of many days, short periods of illumination at night are not falsely detected as dawn events. In addition, the controller 130 can be programmed to turn ON the light source 110 at an appropriate illumination level. For example, the turn-on illumination level may be set to 1 foot candle for non-critical locations and set to 35 foot candles for airports or other critical areas.

In one embodiment, the non-PIR imager 120 and the controller 130 are each powered by the same power source that powers the light source 110, such as commercial or residential AC power mains. In another embodiment, one or both of the non-PIR imager 120 and the controller 130 are each powered by a DC power source, such as a battery. The controller 130 may contain a power regulator to convert line-in AC power to a low-voltage DC power to power the controller 130 and the non-PIR imager 120. Alternatively, the power regulator may be a part of the illumination system 100 that is separate from the controller 130. The interface to the non-PIR imager 120 may be a galvanically isolated type, so that connection to the power mains is isolated for safety reasons.

The controller 130 and the non-PIR imager 120 may be integral parts of a semiconductor-based integrated circuit or chip. The controller 130 may be implemented in the form of a semiconductor-based integrated circuit. Alternatively, some parts of the controller 130 are implemented in the form of semiconductor-based integrated circuit while other parts of the controller 130 are implemented on printed circuit board.

The area the images of which are captured by the non-PIR imager 120 may be approximately the same as the area illuminated by the light source 110. Alternatively, the area the images of which are captured by the non-PIR imager 120 may overlap at least partially the area illuminated by the light source 110. Alternatively, the area the images of which are captured by the non-PIR imager 120 may not overlap the area illuminated by the light source 110.

The illumination system 100 may optionally further include a communication device 140. The communication device 140 may be coupled to the non-PIR imager 120 or the controller 130, or both. The communication device 140 is further coupled to an external data network using protocols in compliance with any or all of the Ethernet, the RS-485 and wireless communication standards, such as the IEEE 802.11 standards for example. The communication device 40 is used to remotely program the controller 130 in one embodiment. Alternatively, the communication device 140 is used to transmit the captured images from the non-PIR imager 120 to a remote user for viewing. The communication device 140 may be used to transmit a notification signal from the controller 130 indicative of motion detection to a remote user. The communication device 140 may be used to transmit an actuation signal from the controller 130 to actuate a device such as an alarm or an automatic door, for example, upon detection of motion.

Figure 2:
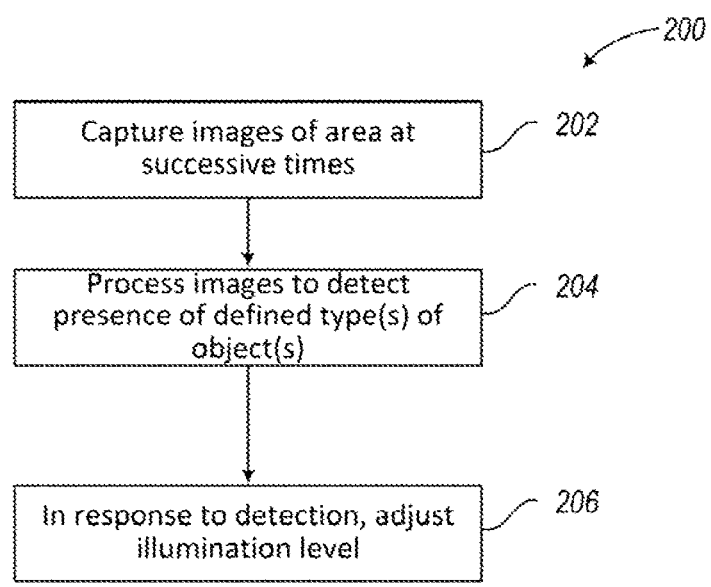
FIG. 2 is a flow chart showing a high level method of operating a controller to control a light source, according to one non-limiting illustrated embodiment.

FIG. 2 shows a high level method 200 of operating a controller 130 to control a light source 110 according to one non-limiting illustrated embodiment.

At 202, a non-Passive Infrared (non-PIR) imager 120 captures images of an area at successive times. The images include image data representative of at least part of a visible portion of an electromagnetic spectrum.

At 204, the controller 130 processes the image data from the non-PIR imager 120 to detect a presence of a defined type of object or defined types of objects in the imaged area. As explained above, the controller 130 may employ any variety of machine vision techniques to identify features in the images that are associated with defined objects. These techniques may include pattern matching, and may employ various feature detection algorithms. As previously indicated, the types of visual features may take a large variety of forms.

At 206, the controller 130 adjusts a level of illumination provided to the area from a light source 110 in response to the detection of a defined type of object in the imaged area.

For example, the controller 130 may adjust the level of illumination from the light source 110 from a first illumination level to a second illumination level that is higher than the first illumination level in response to detecting a defined type of object (e.g., a vehicle) in the imaged area. For instance, at dusk a light source 110 is turned ON to at least the first illumination level that is sufficient to illuminate the illumination area to allow a non-PIR imager 120, such as a video camera or a digital still camera, to detect motion in its field of view. The field of view of the non-PIR imager 120 at least partially overlaps the illuminated area. The first illumination level may, for example, be approximately 10% of the full illumination rating of the illumination device. Alternatively, the first illumination level is a low illumination level that is determined based on the sensitivity of the particular non-PIR imager 120 at use. When the controller 130 detects an object in the image that matches a defined type of object, the controller 130 increases the illumination level to the second illumination level that is appropriate for the area to be illuminated. The second illumination level may be approximately the full illumination rating of the illumination device.

Figure 3:
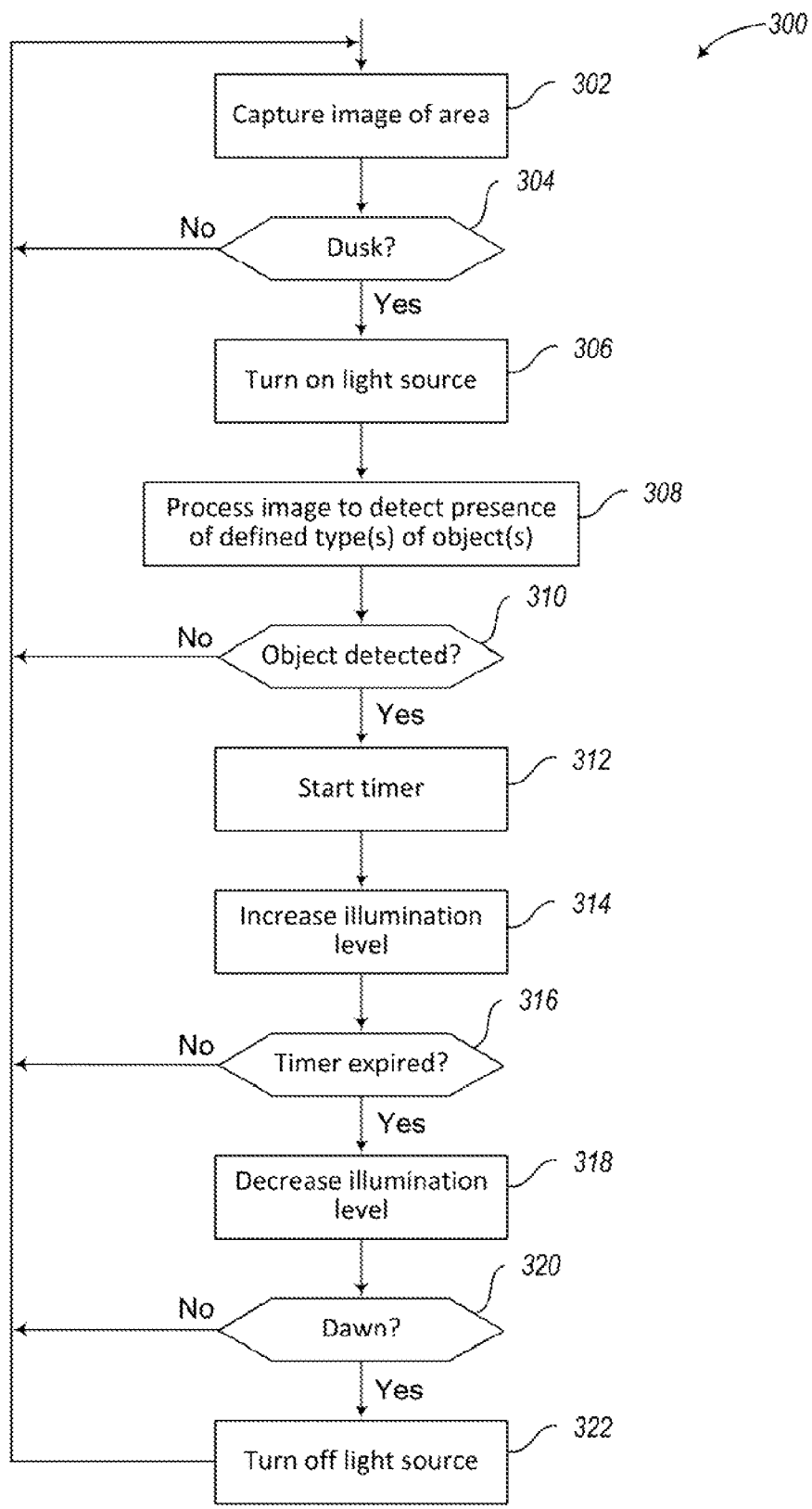
FIG. 3 is a flow chart showing a low level method of operating a controller to control a light source, according to one non-limiting illustrated embodiment.

FIG. 3 shows a low level method 300 of operating a controller 130 to control a light source 110 according to one non-limiting illustrated embodiment.

At 302, a non-Passive Infrared (non-PIR) imager 120 captures images of an area at successive times. The images include image data representative of at least part of a visible portion of an electromagnetic spectrum.

At 304, the controller 130 determines whether low ambient light or dusk conditions exist. As explained above, the controller 130 may determine such in one or more different ways. For example, the controller 130 may detect a level of light sensed by an ambient light sensor. Alternatively, or additionally, the controller 130 may determine a time of day using a real time clock, which may be adjusted to account for the geographic location of the light source. Alternatively or additionally, the controller 130 may detect a level of ambient light sensed by the non-PIR imager 120.

If the controller 130 determines that low ambient light or dusk conditions exist, at 306 the controller 130 turns ON the light source 110. The controller 130 may, for example, turn ON the light source 110 to a first, relatively high level of illumination or output, for example a level sufficient to ensure adequate lighting for the expected traffic in the imaged area. The first level of illumination may, for example, be at or almost at full rated illumination of the light source 110, or may be significantly lower than full rate illumination. Alternatively, the controller 130 may, for example, turn ON the light source 110 to a second, relatively low level of illumination or output, for example a level just sufficient to ensure that the non-PIR will continue to have sufficient light to operate correctly. The controller 130 may alternatively turn ON the light source 110 to some other level of illumination or output, for example between the full or almost full rated level and a level just sufficient to ensure that the non-PIR will continue to operate correctly.

At 308, the controller 130 processes the image data from the non-PIR imager 110 to detect a presence of a defined type of object or defined types of objects in the imaged area. As explained above, the controller 130 may employ any variety of machine vision techniques to identify features in the images that are associated with defined objects. These techniques may include pattern matching, and may employ various feature detection algorithms. As previously indicated, the types of visual features may take a large variety of forms.

At 310, the controller 130 determines whether a defined type of object has been detected in the imaged area.

If the controller 130 determines that a defined type of object has been detected in the imaged area, the controller 130 optionally starts a timer at 312. The timer allows the adjustment of illumination in response to detection of an object to be limited to some defined period (e.g., 1 minute, 5 minutes, 10 minutes, 15 minutes, 60 minutes).

If the controller 130 determines that a defined type of object has been detected in the imaged area, the controller 130 increases a level of illumination at 314. For example, the controller 130 may cause more power to be supplied to the light source 130, or may cause more elements (e.g., individual LEDs) of the light source to output illumination.

At 316, the controller 130 determines whether the timer has expired or reached a threshold time.

If the controller 130 determines that the timer has expired or reached a threshold time, at 318 the controller 130 reduces a level of illumination provided to the area from the light source 110. For example, the controller 130 may cause less power to be supplied to the light source 130, or may cause fewer elements (e.g., individual LEDs) of the light source to output illumination.

At 320, the controller 130 determines high ambient light or dawn conditions exist. As explained above, the controller 130 may determine such in one or more different ways. For example, the controller 130 may detect a level of light sensed by an ambient light sensor. Alternatively or additionally, the controller 130 may determine a time of day using a real time clock, which may be adjusted to account for the geographic location of the light source. Alternatively or additionally, the controller 130 may detect a level of ambient light sensed by the non-PIR imager 120.

If the controller 130 determines that high ambient light or dawn conditions exist, at 322 the controller 130 turns OFF the light source 110.

The method 300 may continually repeat, as indicated in FIG. 3. While illustrated as single sequence of acts or operations, the method 300 may be implement via two or more sets of acts or operations, which may, for example run in parallel, for example as respective threads of a multi-threaded process executing on a multithreaded processor or processor having multiple cores.

Figure 4:
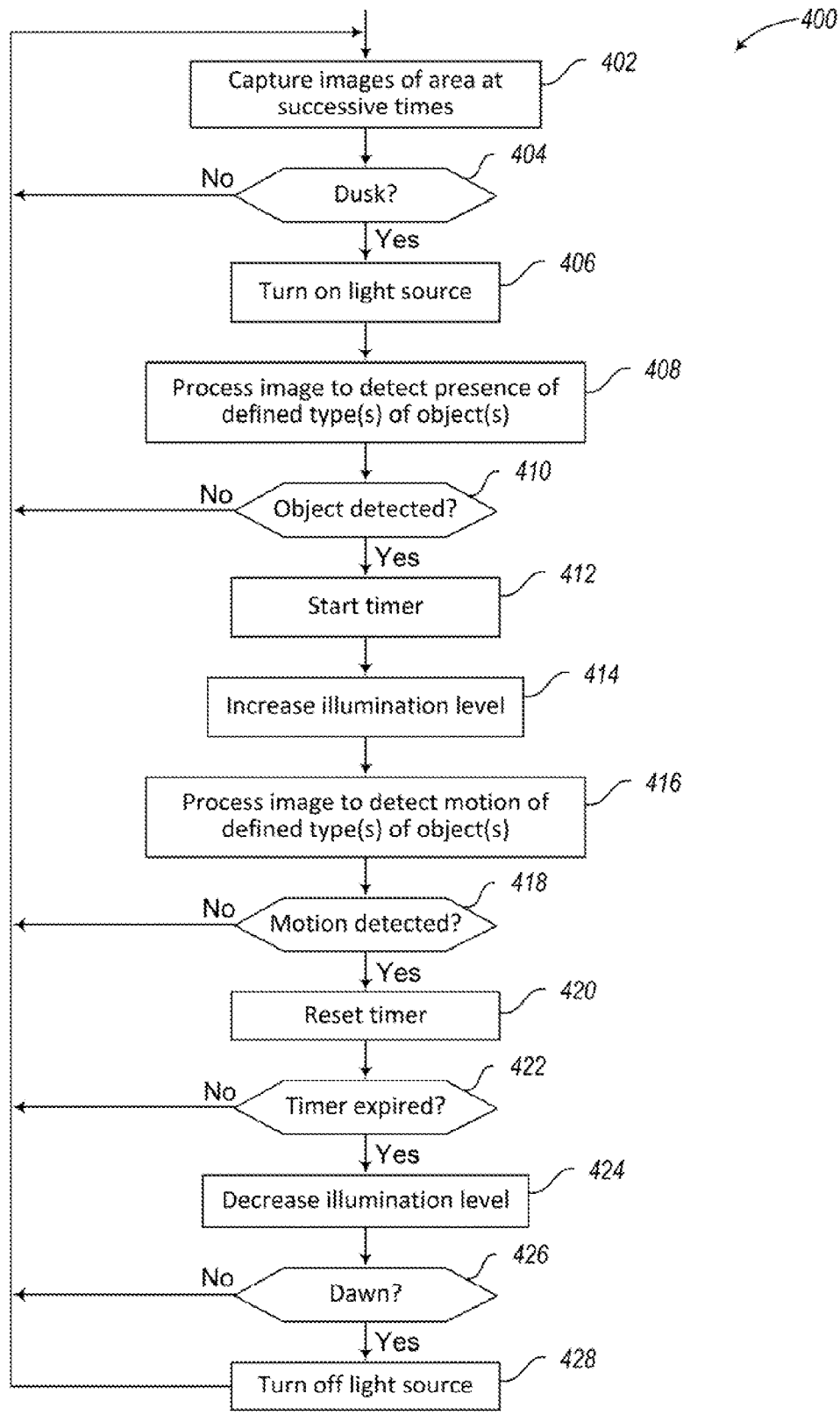
FIG. 4 is a flow chart showing a low level method of operating a controller to control a light source, according to another non-limiting illustrated embodiment.

FIG. 4 shows a low level method 400 of operating a controller 130 to control a light source 110 according to another non-limiting illustrated embodiment.

At 402, a non-Passive Infrared (non-PIR) imager 120 captures images of an area at successive times. The images include image data representative of at least part of a visible portion of an electromagnetic spectrum.

At 404, the controller 130 determines whether low ambient light or dusk conditions exist. As explained above, the controller 130 may determine such in one or more different ways. For example, the controller 130 may detect a level of light sensed by an ambient light sensor. Alternatively, or additionally, the controller 130 may determine a time of day using a real time clock, which may be adjusted to account for the geographic location of the light source. Alternatively or additionally, the controller 130 may detect a level of ambient light sensed by the non-PIR imager 120.

If the controller 130 determines that low ambient light or dusk conditions exist, at 406 the controller 130 turns ON the light source 110. The controller 130 may, for example, turn ON the light source 110 to a first, relatively high level of illumination or output, for example a level sufficient to ensure adequate lighting for the expected traffic in the imaged area. The first level of illumination may, for example, be at or almost at full rated illumination of the light source 110, or may be significantly lower than full rate illumination. Alternatively, the controller 130 may, for example, turn ON the light source 110 to a second, relatively low level of illumination or output, for example a level just sufficient to ensure that the non-PIR will continue to have sufficient light to operate correctly. The controller 130 may alternatively turn ON the light source 110 to some other level of illumination or output, for example between the full or almost full rated level and a level just sufficient to ensure that the non-PIR will continue to operate correctly.

At 408, the controller 130 processes the image data from the non-PIR imager 110 to detect a presence of a defined type of object or defined types of objects in the imaged area. As explained above, the controller 130 may employ any variety of machine vision techniques to identify features in the images that are associated with defined objects. These techniques may include pattern matching, and may employ various feature detection algorithms. As previously indicated, the types of visual features may take a large variety of forms.

At 410, the controller 130 determines whether a defined type of object has been detected in the imaged area.

If the controller 130 determines that a defined type of object has been detected in the imaged area, the controller 130 optionally starts a timer at 412. The timer allows the adjustment of illumination in response to detection of an object to be limited to some defined period (e.g., 1 minute, 5 minutes, 10 minutes, 15 minutes, 60 minutes).

If the controller 130 determines that a defined type of object has been detected in the imaged area, the controller 130 increases a level of illumination at 414. For example, the controller 130 may cause more power to be supplied to the light source 130, or may cause more elements (e.g., individual LEDs) of the light source to output illumination.

At 416, the controller 130 processes the image data from the non-PIR imager 110 to detect motion of the defined type of object or other types of objects in the imaged area. As explained above, the controller 130 may employ any variety of machine vision techniques to identify features in the images that are associated with defined objects. These techniques may include pattern matching, and may employ various feature detection algorithms. As previously indicated, the types of visual features may take a large variety of forms.

In particular, data representative of a first image of at least a portion of the area at a first time may be recorded, and data representative of a second image of at least a portion of the area at a second time that is after the first time may also recorded, when the non-PIR imager 110 images the area.

When processing the image data from the non-PIR imager 110 to detect motion, the controller 130 may compare the data representative of the first image and data representative of the second image to detect the movement in the area. Comparing the data representative of the first and the second images may include determining whether or not at least a threshold number of pixels in the first and the second images have changed by at least a threshold amount in at least one aspect from the first image to the second image. Comparing of the data representative of the first and the second images may also include determining whether or not each of the pixels that have changed by at least the threshold amount is within a threshold distance from one another. The controller 130 may compare the data representative of the pixels of the first image with the data representative of the pixels of the second image to identify pixels that have changed in at least one aspect by more than a threshold amount between the first and the second images. The controller 130 may also determine a quantity of the pixels that have changed by more than the threshold amount and that are within a threshold distance from other pixels that have changed by more than the threshold amount. The controller may generate a first signal to indicate detection of movement if the quantity of the changed pixels is greater than a threshold quantity.

At 418, the controller 130 determines whether motion has been detected. The motion may be that of the defined object(s). Additionally, or alternatively, the motion may be that of some other object. For example, the controller 130 may determine with a defined object, such as a vehicle has moved between some number of images captured at successive times. Additionally, the controller 130 may determine of some other object, for instance a driver of the vehicle, has moved between some number of images captured at successive times.

If the controller 130 determines that motion of the defined object is detected, at 420, the controller 130 resets the timer.

At 422, the controller 130 determines whether the timer has expired or reached a threshold time. If the timer has not expired, control returns to 416. Otherwise, control passes to 424.

If the controller 130 determines that the timer has expired or reached a threshold time, at 424 the controller 130 reduces a level of illumination provided to the area from the light source 110. For example, the controller 130 may cause less power to be supplied to the light source 130, or may cause fewer elements (e.g., individual LEDs) of the light source to output illumination.

At 426, the controller 130 determines high ambient light or dawn conditions exist. As explained above, the controller 130 may determine such in one or more different ways. For example, the controller 130 may detect a level of light sensed by an ambient light sensor. Alternatively, or additionally, the controller 130 may determine a time of day using a real time clock, which may be adjusted to account for the geographic location of the light source. Alternatively or additionally, the controller 130 may detect a level of ambient light sensed by the non-PIR imager 120.

If the controller 130 determines that high ambient light or dawn conditions exist, at 428 the controller 130 turns OFF the light source 110.

The method 400 may continually repeat, as indicated in FIG. 4. While illustrated as single sequence of acts or operations, the method 400 may be implement via two or more sets of acts or operations, which may, for example run in parallel, for example as respective threads of a multi-threaded process executing on a multithreaded processor or processor having multiple cores.

Energy conservation can be achieved by turning OFF the light source during daylight hours when illumination of the area by artificial illumination is unnecessary. For example, the area of concern is illuminated at the first illumination level at dark after daylight hours in order for the light source to be able to detect motion. When motion is detected, indicating the possibility of presence of people, the area is illuminated at the second illumination level, which is brighter than the first illumination level, so that the illuminated area is bright enough for human activities. During the daylight hours, however, illumination of the area by a light source is unnecessary and therefore illumination by the illumination device is terminated.

Whether or not the present time is during daylight hours may be determined based on an ambient light level detected by a photosensor. Alternatively or additionally, whether or not the present time is during daylight hours may be determined based on a present time indicated by a real-time clock. Alternatively or additionally, whether or not the present time is during daylight hours may be determined based on a gain setting of a non-PIR imager 120. Alternatively or additionally, whether or not the present time is during daylight hours may be determined based on the signal level from the non-PIR imager 120, such as an NTSC video signal level or the digital values in a digital camera signal. Alternatively, whether or not the present time is during daylight hours may be determined based on a combination of any, some or all of an ambient light level detected by an ambient light photosensor, a present time indicated by a real-time clock, a gain setting of a non-PIR imager 120, and the signal level from the non-PIR imager 120.

In some embodiments, the controller 130 may send or cause a notification signal to be transmitted upon detection of movement in the area. The transmission of the notification signal may be via a communication link based on Ethernet. The transmission of the notification signal may be via a communication link based on RS-485. The transmission of the notification signal may be via a communication link based on wireless communication standards such as, for example, the IEEE 802.11 standards or other wireless communication standards used in mobile phone applications. The transmission of the notification signal may be via a communication link based on any combination of the Ethernet, RS-485, and wireless communication standards.

The transmitted notification signal may be used to actuate a device in response to the motion detection. For example, the notification signal may be used to actuate a security alarm to provide notification of a potential intrusion by uninvited personnel. As another example, the notification signal may be used to open an automatic door to allow a visitor to enter a fenced premise. The actuation of a device may concurrently occur with the adjustment of the illumination level provided by an illumination device.

Thus, a luminaire with controllable illumination level, such as the illumination system 100, is disclosed herein and should greatly improve upon the problems associated with the conventional approach to automatic control of illumination level of lighting systems described above. For instance, the illumination system 100 can detect defined types of objects at a distance of at least 25 meters away. Other than adjusting the illumination level based on detection of particular types of objects (e.g., vehicles), the illumination level can also be adjusted based on the ambient light level and/or the present time of day and/or based on motion of an object. The illumination system 100 can be programmed remotely, for example, optically or wirelessly. Besides controlling the level of illumination of an area, the illumination system 100 can also serve as a security device.

As an example of one of the many possible uses of the systems and methods discussed herein, the illumination system may be employed in monitoring traffic, for example determining level of traffic flows or "counting vehicles" that pass a given point (e.g., intersection of two streets, stop light).

Previous attempts have to count vehicles have typically employed a pneumatic tube positioned across a road surface and an electromechanical device that registers each change in the pressure in the tube of some threshold magnitude as a vehicle count. Unfortunately, this approach suffers from a number of drawbacks. For example, this approach requires the road to be shut down in order to install the tube, replace the tube, otherwise service the tube, and remove the tube at the end of a study. Notably, the tubes are particularly subject to wear, and often need replacement. A worn tube may also prevent the system from accurately counting vehicles. Typically, the period during which the system is inaccurate is not known or readily ascertainable, frustrating the ability to accurately assess traffic flows. Further, this approach may be inaccurate due to vehicles passing which have more than two axles (e.g., trucks), thus registering more than two counts per vehicle. This approach also does not allow the type of vehicle (e.g., truck versus automobile versus bus) to be assessed.

However, the apparatus and methods described herein may be used to monitor traffic, typically without the above described drawbacks. For example, a traffic monitoring system may be positioned along a side of a road proximate a point to be monitored. Positioning along the side of the road allows images of traffic on the road to be captured, but advantageously avoids the need to close the road to traffic. Using image recognition techniques allows the traffic monitoring system to accurately distinguish motor vehicles (e.g., automobiles or cars, trucks, buses, motorcycles) from other objects (e.g., humans, bicycles) moving along the road. Image recognition may also allow the traffic monitoring system to accurately distinguish between different types of motor vehicles, for example distinguishing automobiles or cars from other vehicles, distinguishing trucks from other motor vehicles, distinguishing buses from other motor vehicles, and/or distinguishing motorcycles from other motor vehicles. Such allows collection and analysis of information not typically collected via existing systems.

For example, analysis between successive image allows assessment or determination of a speed or velocity of a motor vehicle. Speed can be determined, for example based at least in part on a knowledge of how far apart in time the images were captured. Such may be discerned based at least in part on frame rate or image capture rate and a knowledge of how far apart the images are from one another in total number of images captured. Speed can also be determined by assessing how far a portion of the object has traveled between two or more successive images. Note, as used herein the term successive means at different times, but does not necessarily mean immediately successive. Thus, two successive images may be separate by other images which were captured between the two.

Also for example, the motor vehicle monitoring system allows the logging of the passage of one or more motor vehicles to a database, logically associated with a time of detection or imaging of the motor vehicle. Further, images of the motor vehicles themselves may be stored, logically associated with the time of detection and/or place of detection.

The traffic monitoring system is more resilient and robust than the above described existing pneumatic based techniques. Additionally, should an error occur, the traffic monitoring system may record the time of error and even automatically cause an alert or other notification to be sent, for example requesting servicing. Notably, servicing does not require closing of the road.

The traffic monitoring system may advantageously provide illumination, allowing operation in low light conditions, for example a night and/or in twilight or dusk conditions. Various methods of saving energy may be employed. For example, no illumination may be provided when not required to capture sufficiently detailed images of the traffic. When illumination is required, the illumination may be provided at a first level, sufficient to, for example, capture an image that is sufficiently detailed and clear to determine that a motor vehicle is approaching. The illumination may then be increased to a second level, sufficient to, for example, capture an image that is sufficiently detailed and clear to determine or distinguish a type of motor vehicle (e.g., car versus truck versus bus). The image may even be sufficiently detailed and clear to determine or distinguish a make and model of the motor vehicle. The image may even be sufficiently detailed and clear to accurately read unique identifying information from the motor vehicle, for example identifying information from a license plate. The level of illumination may then be reduced until the system recognizes another approaching object as a motor vehicle.

The traffic monitoring system may be employed with its own active source of illumination, which the traffic monitoring system controls. Such would provide the freedom to locate the traffic monitoring system away from other sources of light, such as street lights.

The traffic monitoring system could even be implemented in street lights or luminaires, for example suspended over a roadway from a lamp post or similar structure. In such an implementation, a controller may be built into the street light luminaires. Alternatively, a controller may be retrofitted to existing street lights or luminaires. Such provides dual benefits of providing illumination, while also monitoring traffic, for less the cost and infrastructure than is currently required using dedicated systems or devices. The costs savings from energy savings may offset or even completely cover the costs of the traffic monitoring systems. This approach permits an entire geographic regions (e.g., city, highway) to be monitored, with full time (e.g., 24 hours, 7 days a week) real-time or almost real-time access to any number or all of the traffic monitoring systems. The information discerned from such can be used to populate real-time traffic flow maps, which can be provided to vehicle operators, traffic reporters, emergency services personnel, transportation department personnel and planners.

Alternatively, the traffic monitoring system may employ ambient lighting, such as sunlight or solar insolation, or even ambient street lighting provided from an active source that is not controlled by the traffic monitoring system. In such implementations, positioning the traffic monitoring system proximate active lighting such as street lights or luminaires may be desirable.

The traffic monitoring system may store images (e.g., still or moving) and or transmit those images remotely from the traffic monitoring system. Such may allow more advanced or sophisticated processing than might otherwise be achievable in the confines a traffic monitoring system mounted proximate a roadway. Additionally, or alternatively, the traffic monitoring system may compute and transmit traffic statistics to one or more remotely located computing systems. The traffic monitoring system may advantageously take advantage of existing power transmission infrastructure (e.g., power lines) to transmit information and/or data, as well as to receive command and control signals or program applications (e.g., firmware upgrades). For example, where implement as part of a street light or luminaire, the traffic monitoring system may use power line carrier techniques to transmit and/or receive information, data, instructions, commands over existing power lines (e.g., 120 V, 60 Hz lines). Alternatively, other wired or wireless communications channels may be employed. For example, the traffic monitoring system may communicate with host systems and/or other traffic monitoring systems via one or more wired and/or wireless networks (e.g., WI-FI®, Cellular, 802.11 compliant) or combinations of the same. Also for example, the traffic monitoring system may communicate with portable device (e.g., Smartphone, tablet computing system, laptop computing system) via one or more wireless networks (e.g., WI-FI®, Cellular, BLUETOOTH®, 802.11 compliant) or combinations of the same.

The above description of illustrated embodiments, including what is described in the Abstract, is not intended to be exhaustive or to limit the embodiments to the precise forms disclosed. Although specific embodiments of and examples are described herein for illustrative purposes, various equivalent modifications can be made without departing from the spirit and scope of the disclosure, as will be recognized by those skilled in the relevant art. The teachings provided herein of the various embodiments can be applied to other image based systems, not necessarily the exemplary illumination control system generally described above.

For instance, while the example is generally discussed in terms of motor vehicles, other a traffic monitoring system may monitor other traffic. For example, the traffic monitoring system may monitor pedestrian traffic or bicycle traffic, or even ship or aircraft traffic.

Also for instance, the foregoing detailed description has set forth various embodiments of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one embodiment, the present subject matter may be implemented via Application Specific Integrated Circuits (ASICs). However, those skilled in the art will recognize that the embodiments disclosed herein, in whole or in part, can be equivalently implemented in standard integrated circuits, as one or more computer programs executed by one or more computers (e.g., as one or more programs running on one or more computer systems), as one or more programs executed by on one or more controllers (e.g., microcontrollers) as one or more programs executed by one or more processors (e.g., microprocessors), as firmware, or as virtually any combination thereof, and that designing the circuitry and/or writing the code for the software and or firmware would be well within the skill of one of ordinary skill in the art in light of the teachings of this disclosure.

When logic is implemented as software and stored in memory, logic or information can be stored on any computer-readable medium for use by or in connection with any processor-related system or method. In the context of this disclosure, a memory is a computer-readable medium that is an electronic, magnetic, optical, or other physical device or means that contains or stores a computer and/or processor program. Logic and/or the information can be embodied in any computer-readable medium for use by or in connection with an instruction execution system, apparatus, or device, such as a computer-based system, processor-containing system, or other system that can fetch the instructions from the instruction execution system, apparatus, or device and execute the instructions associated with logic and/or information.

In the context of this specification, a "computer-readable medium" can be any element that can store the program associated with logic and/or information for use by or in connection with the instruction execution system, apparatus, and/or device. The computer-readable medium can be, for example, but is not limited to, an electronic, magnetic, optical, electromagnetic, infrared, or semiconductor system, apparatus or device. More specific examples (a non-exhaustive list) of the computer readable medium would include the following: a portable computer diskette (magnetic, compact flash card, secure digital, or the like), a random access memory (RAM), a read-only memory (ROM), an erasable programmable read-only memory (EPROM, EEPROM, or Flash memory), a portable compact disc read-only memory (CDROM), digital tape. Note that the computer-readable medium could even be paper or another suitable medium upon which the program associated with logic and/or information is printed, as the program can be electronically captured, via for instance optical scanning of the paper or other medium, then compiled, interpreted or otherwise processed in a suitable manner if necessary, and then stored in memory.

Also for instance, the methods illustrated and described herein may include additional acts and/or may omit some acts. The methods illustrated and described herein may perform the acts in a different order. Some of the acts may be performed sequentially, while some acts may be performed concurrently with other acts. Some acts may be merged into a single act through the use of appropriate circuitry. For example, compensation and level shifting may be combined.

The various embodiments described above can be combined to provide further embodiments. To the extent that they are not inconsistent with the teachings herein, the teachings of: U.S. provisional patent application Ser. No. 61/052,924 filed May 13, 2008; U.S. patent application Ser. No. 12/437,467 filed May 7, 2009 and published as U.S. patent application Publication No. 2009-0284155; U.S. provisional patent application Ser. No. 61/051,619 filed May 8, 2008; U.S. patent application Ser. No. 12/437,472 filed May 7, 2009 and published as U.S. patent application Publication No. 2009-0278474; U.S. provisional patent application Ser. No. 61/088,651 filed Aug. 13, 2008; U.S. patent application Ser. No. 12/540,250 filed Aug. 12, 2009 and published as U.S. patent application Publication No. 2010-0090577; U.S. provisional patent application Ser. No. 61/115,438 filed Nov. 17, 2008; U.S. provisional patent application Ser. No. 61/154,619 filed Feb. 23, 2009; U.S. patent application Ser. No. 12/619,535 filed Nov. 16, 2008 and published as U.S. patent application Publication No. 2010-0123403; U.S. provisional patent application Ser. No. 61/174,913 filed May 1, 2009 (0.406P1); U.S. patent application Ser. No. 12/769,956 filed Apr. 29, 2010 and published as U.S. patent application Publication No. 2010-0277082; U.S. provisional patent application Serial No. 61/180,017 filed May 20, 2009, U.S. patent application Ser. No. 12/784,080 filed May 2010 and published as U.S. patent application Publication No. 2010-0295946; U.S. provisional patent application Ser. No.

61/229,435 filed Jul. 29, 2009; U.S. patent application Ser. No. 12/846,516 filed Jul. 29, 2010 and published as U.S. patent application Publication No. 2011-0026264; U.S. provisional patent application Ser. No. 61/295,519 filed Jan. 15, 2010; U.S. provisional patent application Ser. No. 61/406,490 filed Oct. 25, 2010; U.S. patent application Ser. No. 13/007,080 filed Jan. 14, 2011; U.S. provisional patent application Ser. No. 61/333,983 filed May 12, 2010; U.S. patent application Ser. No. 12/784,091 filed May 20, 2010 and published as U.S. patent application Publication No. 2011-0295454; U.S. provisional patent application Ser. No. 61/346,263 filed May 19, 2010; U.S. patent application Ser. No. 12/784,093 filed May 20, 2010; U.S. patent application Ser. No. 13/166,626 filed Jun. 22, 2011; U.S. patent application Ser. No. 13/085,301 filed Apr. 12, 2011; U.S. patent application Ser. No. 13/212,074 filed Aug. 17, 2011; and U.S. provisional patent application Ser. No. 61/534,722 filed Sep. 14, 2011 are each incorporated herein by reference in their entirety.

The above description of illustrated embodiments, including what is described in the Abstract, is not intended to be exhaustive or to limit the embodiments to the precise forms disclosed. Although specific embodiments of and examples are described herein for illustrative purposes, various equivalent modifications can be made without departing from the spirit and scope of the disclosure, as will be recognized by those skilled in the relevant art. The teachings provided herein of the various embodiments can be applied to other context, not necessarily the exemplary context of controlling operations of an illumination system generally described above.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

We claim:

1. An illumination system, comprising:
   a light source which in use provides at least two levels of illumination;
   a two-dimensional non-Passive Infrared (non-PIR) imager which in use images an area and to produce image data representative of images across at least part of a visible portion of an electromagnetic spectrum; and
   a controller communicatively coupled to the non-PIR imager, the controller receives the image data from the non-PIR imager, wherein the controller performs one or more machine-vision object recognition techniques with respect to the received image data to detect one or more visual features within the received image data and determines a match between the one or more visual features and one or more defined features representative of a defined type of object to detect a presence of the defined type of object in the area, and the controller coupled to control operation of the light source based on at least in part detection of objects of the defined type of object in the area, wherein the controller adjusts the level of illumination provided to the area from the light source to a first level when a level of ambient light is greater than a threshold level, adjusts the level of illumination provided to the area from the light source to a second level that is greater than the first level when the level of ambient light is less than the threshold level, and adjusts the level of illumination provided to the area from the light source to a third level that is greater than the second level in response to detection of at least one object of the defined type object in the area.

2. The illumination system of claim 1 wherein the controller adjusts the level of illumination provided by the light source based on at least in part the detection of an object that corresponds to a motor vehicle in the area.

3. The illumination system of claim 1 wherein the controller causes the light source to provide illumination one of the first level or the second level when the image data indicates the defined type of object is not in the area and to provide illumination at the third level when the image data indicates the defined type of object is in the area.

4. The illumination system of claim 1 wherein the non-PIR imager captures a first image of the area at a first time and captures a second image of the area at a second time, after the first time, each of the first and the second images having a respective plurality of pixels, and wherein the controller compares the image data representative of the first and the second images to detect an appearance or a change between the first and the second images.

5. The illumination system of claim 4 wherein the controller adjusts an illumination level of the light source from one of the first level or the second level to the third level when the image data representative of the first image and the image data representative of the second image differ by more than a threshold amount.

6. The illumination system of claim 4 wherein the controller adjusts an illumination level of the light source from one of the first level or the second level to the third level when the image data representative of the first image and the image data representative of the second image differ by more than a threshold amount and when a quantity of the pixels that have changed and that are within a threshold distance from one another is greater than a threshold quantity.

7. The illumination system of claim 1 wherein the controller deducts the level of illumination provided by the light source from a detected level of ambient brightness and adjusts the illumination level provided by the light source in response to the deduction.

8. The illumination system of claim 1 wherein the controller adjusts the level of illumination from the light source a defined delay period after detecting the presence of the defined type of object in the area.

9. The illumination system of claim 1 wherein the defined type of object is at least one of a vehicle or a human.

10. The illumination system of claim 1 wherein the non-PIR imager comprises at least one of a solid-state camera, a video camera, or a digital still camera and the light source, non-PIR imager and controller are part of a light fixture that is mountable to an outdoor structure.

11. The illumination system of claim 1 wherein an area illuminated by the light source is at least approximately coincident with the area imaged by the non-PIR imager.

12. A method of controlling a light source, the method comprising:
   imaging an area with a non-Passive Infrared (non-PIR) imager to produce image data representative of at least part of a visible portion of an electromagnetic spectrum;
   processing receiving by a processor the image data from the non-PIR imager;
   performing by the processor one or more machine-vision object recognition techniques with respect to the image data from the non-PIR imager to detect one or more visual features within the received image data, the one or more visual features comprising one or more of headlights and taillights of a vehicle;
determining by the processor a match between the one or more visual features and one or more defined features representative of a defined type of object to detect at least one object of the defined type of object in the area;
analyzing by the processor the received image data to determine whether the image data includes motion of the detected at least one object of the defined type of object;
in response to the detection of the at least one object of the defined type of object in the area but not motion of the detected at least one object, adjusting a level of illumination provided to the area from a light source to a first non-zero illumination level; and
in response to the detection of the at least one object of the defined type of object in the area and motion of the detected at least one object, adjusting the level of illumination provided to the area from the light source to a second non-zero illumination level that is greater than the first non-zero illumination level.

13. A traffic monitor and illumination system, comprising:
a light source which in use provides at least two levels of illumination;
a two-dimensional non-Passive Infrared (non-PIR) imager which in use images an area and to produce image data representative of successive images of the area over time; and
a controller communicatively coupled to the non-PIR imager, the controller receives the image data from the non-PIR imager, wherein the controller performs one or more machine-vision object recognition techniques with respect to the received image data to detect one or more visual features within the received image data, the one or more visual features comprising one or more of headlights and taillights of a vehicle, and the controller determines a match between the one or more visual features and one or more defined features representative of a defined type of object to detect a presence of the defined type of object in the area, and causes a count of a total number of the objects of the defined type of object that pass through the area over a period of time based on at least in part on the detection of the presence of the defined type of object in the area, wherein the controller is coupled to control operation of the light source based on at least in part detection of objects of the defined type of object in the area.

14. The traffic monitor system of claim 13 wherein the controller distinguishes motor vehicles from other types of objects.

15. The traffic monitor system of claim 14 wherein the controller distinguishes types of motor vehicles from other types of motor vehicles.

16. The traffic monitor system of claim 14 wherein the controller distinguishes types of makes and models of motor vehicles from other types of makes and models of motor vehicles.

17. The traffic monitor system of claim 14 wherein the controller distinguishes types of unique identifiers carried by motor vehicles from other types of unique identifiers carried by motor vehicles.

18. The traffic monitor system of claim 13 wherein the controller causes the light source to provide illumination at a first illumination level when the image data indicates the defined type of object is not in the area and to provide illumination at a second illumination level when the image data indicates the defined type of object is in the area, the second illumination level greater than the first illumination level.

19. A method of controlling a traffic monitoring and illumination system, the method comprising:
imaging an area with a non-Passive Infrared (non-PIR) imager to produce image data representative of at least part of a visible portion of an electromagnetic spectrum;
performing by a processor one or more machine-vision object recognition techniques with respect to the image data from the non-PIR imager to detect one or more visual features within the image data from the non-PIR imager, the one or more visual features comprising one or more of headlights and taillights of a vehicle;
determining a match between the one or more visual features and one or more defined features representative of a defined type of object to detect at least one object of the defined type of object in the area; and
in response to the detection of the at least one object of the defined type of object in the area, adjusting a count of traffic in the area and adjusting a level of illumination provided to the area from a light source.

20. The method of claim 19 wherein determining a match between the one or more visual features and one or more defined features representative of a defined type of object to detect at least one object of the defined type of object in the area includes distinguishing motor vehicles from other types of objects.

21. The method of claim 20 wherein determining a match between the one or more visual features and one or more defined features representative of a defined type of object to detect at least one object of the defined type of object in the area includes distinguishing types of motor vehicles from other types of motor vehicles.

22. The method of claim 20 wherein determining a match between the one or more visual features and one or more defined features representative of a defined type of object to detect at least one object of the defined type of object in the area includes distinguishing types of makes and models of motor vehicles from other types of makes and models of motor vehicles.

23. The method of claim 20 wherein determining a match between the one or more visual features and one or more defined features representative of a defined type of object to detect at least one object of the defined type of object in the area includes distinguishing types of unique identifiers carried by motor vehicles from other types of unique identifiers carried by motor vehicles.

24. The method of claim 19 wherein adjusting a level of illumination provided to the area from a light source comprises operating the light source to provide illumination at a first illumination level when the defined type of object is not detected in the area and to provide illumination at a second illumination level when the defined type of object is detected in the area, the second illumination level greater than the first illumination level.

25. The method of claim 19, further comprising:
wherein processing by a processor the image data from the non-PIR imager to detect at least one object of a defined type of object in the area includes determining a speed of the at least one object.

26. The illumination system of claim 1 wherein the controller causes a count of a total number of the objects of the defined type of object that pass through the area over a period of time based on at least in part on the detection of the presence of the defined type of object in the area.

27. The illumination system of claim 1 wherein the defined type of object comprises a license plate of a vehicle.

28. The illumination system of claim 1 wherein the one or more visual features comprise one or more of headlights and taillights of a vehicle.

29. The illumination system of claim 1 wherein the one or more visual features comprise one or more of a relative position and a spacing between a pair of headlights or taillights of a vehicle depicted in the received imagery and the one or more defined features comprise one or more of an expected relative position and an expected spacing.

30. The illumination system of claim 1 wherein the one or more visual features comprise a reflectance pattern exhibited by one or more of a windshield, a rear window, and a side window of a vehicle depicted in the received imagery.

31. The method of claim 12, further comprising:
in response to the detection of the at least one object of the defined type of object in the area, adjusting a count of a number of objects that have passed through the area over a period of time.

32. The method of claim 12 wherein performing by the processor one or more machine-vision object recognition techniques with respect to the image data from the non-PIR imager to detect one or more visual features within the received image data comprises performing by the processor the one or more machine-vision object recognition techniques with respect to the image data from the non-PIR imager to detect a reflectance pattern exhibited by one or more of a windshield, a rear window, and a side window of a vehicle depicted in the received imagery.

33. The traffic monitor and illumination system of claim 13 wherein the light source provides at least three levels of illumination that include at least a first non-zero illumination level and a second non-zero illumination level that is greater than the first non-zero illumination level and the controller analyzes the received image data to determine whether the image data includes motion of the detected defined type of object in the area, adjusts a level of illumination provided to the area from the light source to the first non-zero illumination level in response to the detection of the presence of the defined type of object in the area but not motion of the detected defined type of object, and adjusts the level of illumination provided to the area from the light source to the second non-zero illumination level in response to the detection of the presence of the defined type of object in the area and motion of the detected defined type of object.

34. The traffic monitor and illumination system of claim 13 wherein the controller, in response to the detection of the presence of the defined type of object in the area, stores the received imagery and associates a time of detection with the stored imagery.

35. The method of claim 19 wherein adjusting a level of illumination provided to the area from a light source in response to the detection of the at least one object of the defined type of object in the area comprises:
analyzing by the processor the received image data to determine whether the image data includes motion of the detected at least one object of the defined type;
in response to the detection of the at least one object of the defined type of object in the area but not motion of the detected at least one object, adjusting the level of illumination provided to the area from the light source to a first non-zero illumination level; and
in response to the detection of the at least one object of the defined type of object in the area and motion of the detected at least one object, adjusting the level of illumination provided to the area from the light source to a second non-zero illumination level.

36. The method of claim 19, further comprising:
periodically transmitting the count to a remotely located computing system.

37. A method of controlling a traffic monitoring and illumination system, the method comprising:
imaging an area with a non-Passive Infrared (non-PIR) imager to produce image data representative of at least part of a visible portion of an electromagnetic spectrum;
performing by a processor one or more machine-vision object recognition techniques with respect to the image data from the non-PIR imager to detect one or more visual features within the image data from the non-PIR imager;
determining a match between the one or more visual features and one or more defined features representative of a defined type of object to detect at least one object of the defined type of object in the area;
determining a level of ambient light;
adjusting the level of illumination provided to the area from a light source to a first level when the level of ambient light is greater than a threshold level;
adjusting the level of illumination provided to the area from the light source to a second level that is greater than the first level when the level of ambient light is less than the threshold level; and
in response to the detection of the at least one object of the defined type of object in the area, adjusting a count of traffic in the area and adjusting a level of illumination provided to the area from the light source to a third level that is greater than the second level in response to detection of the at least one object of the defined type object in the area.

38. An illumination system, comprising:
a light source which in use provides at least two levels of illumination;
a two-dimensional non-Passive Infrared (non-PIR) imager which in use images an area and to produce image data representative of images across at least part of a visible portion of an electromagnetic spectrum; and
a controller communicatively coupled to the non-PIR imager, the controller receives the image data from the non-PIR imager, wherein the controller performs one or more machine-vision object recognition techniques with respect to the received image data to detect one or more visual features within the received image data and determines a match between the one or more visual features and one or more defined features representative of a defined type of object to detect a presence of the defined type of object in the area, the one or more visual features comprise one or more of headlights and taillights of a vehicle, and the controller coupled to control operation of the light source based on at least in part detection of objects of the defined type of object in the area.

* * * * *